(12) United States Patent
Pappas et al.

(10) Patent No.: US 12,449,661 B2
(45) Date of Patent: *Oct. 21, 2025

(54) ARTIFICIAL REALITY SYSTEMS INCLUDING DIGITAL AND ANALOG CONTROL OF PIXEL INTENSITY

(71) Applicant: Meta Platforms Technologies, LLC, Menlo Park, CA (US)

(72) Inventors: Ilias Pappas, Cork (IE); William Thomas Blank, Bellevue, WA (US); Ramakrishna Chilukuri, San Jose, CA (US); Michael Yee, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,901

(22) Filed: Jan. 23, 2023

(65) Prior Publication Data

US 2023/0161165 A1 May 25, 2023

Related U.S. Application Data

(63) Continuation of application No. 17/067,070, filed on Oct. 9, 2020, now Pat. No. 11,567,325.

(51) Int. Cl.
*G02B 27/01* (2006.01)
*G06T 7/90* (2017.01)
*G06T 19/00* (2011.01)

(52) U.S. Cl.
CPC ......... *G02B 27/0172* (2013.01); *G06T 7/90* (2017.01); *G06T 19/006* (2013.01)

(58) Field of Classification Search
CPC ..... G02B 27/0172; G06T 7/90; G06T 19/006; G09G 3/2022; G09G 3/2014;
(Continued)

(56) References Cited

U.S. PATENT DOCUMENTS 6,044,004 A 3/2000 Kramer
7,554,844 B2 6/2009 Werner et al.
(Continued)

FOREIGN PATENT DOCUMENTS

CN 1584965 A 2/2005
CN 106910449 A * 6/2017 ............... G09G 3/20
(Continued)

OTHER PUBLICATIONS

Carmona R., et al., "A 0.5pm CMOS Random Access Analog Memory Chip for TeraOPS Speed Multimedia Video Processing," IEEE Transactions on Multimedia, Sep. 7, 1998, pp. 1-29.
(Continued)

*Primary Examiner* — Kirk W Hermann
(74) *Attorney, Agent, or Firm* — Greenberg Traurig, LLP

(57) ABSTRACT

Electronic display devices include digital and analog control of pixel intensity. A digital pixel control circuit and an analog pixel control circuit are provided within each pixel. The digital pixel control circuit employs digital PWM techniques to control a number of subframes within each frame during which a driving current is supplied to a light emitting element within the pixel. The analog pixel control circuit controls the level of the driving current supplied to the light emitting element within the pixel during the frame. In one example, the digital pixel control circuit and the analog pixel control circuit may together control pixel intensity with the analog pixel control circuit providing additional in-pixel bits for increased color depth. Alternatively, the digital pixel control circuit may control pixel intensity and the analog pixel control circuit may control non-uniformity compensation.

20 Claims, 18 Drawing Sheets

(58) Field of Classification Search
CPC ...... G09G 3/3233; G09G 3/2081; G09G 3/32; G09G 2300/0842; G09G 2300/0857; G09G 2300/0861
See application file for complete search history.

(56) References Cited

U.S. PATENT DOCUMENTS

| | | | |
|---|---|---|---|
| 11,138,920 B2 | 10/2021 | Yee | |
| 11,138,921 B2 | 10/2021 | Yee | |
| 11,430,371 B2 | 8/2022 | Yee | |
| 11,567,325 B2 | 1/2023 | Pappas et al. | |
| 2001/0043177 A1 | 11/2001 | Huston et al. | |
| 2002/0033783 A1* | 3/2002 | Koyama | G09G 3/3233 345/82 |
| 2003/0214493 A1* | 11/2003 | Akimoto | G09G 3/3648 345/204 |
| 2006/0092146 A1* | 5/2006 | Johnson | G09G 3/3233 345/204 |
| 2015/0042703 A1 | 2/2015 | Chaji et al. | |
| 2017/0032729 A1 | 2/2017 | Moldvai | |
| 2017/0270850 A1* | 9/2017 | Pappas | G09G 3/2077 |
| 2017/0330509 A1 | 11/2017 | Cok et al. | |
| 2018/0182279 A1* | 6/2018 | Sakariya | G09G 3/2088 |
| 2019/0034798 A1 | 1/2019 | Yu et al. | |
| 2019/0156767 A1 | 5/2019 | Waller et al. | |
| 2019/0347981 A1* | 11/2019 | Horowitz | H04N 9/3135 |
| 2020/0043405 A1* | 2/2020 | Akimoto | G09G 3/32 |

FOREIGN PATENT DOCUMENTS

| | | |
|---|---|---|
| EP | 1570458 A2 | 9/2005 |
| JP | H1115430 A | 1/1999 |
| JP | 2008003455 A | 1/2008 |
| JP | 2017017313 A | 1/2017 |
| JP | 2018519539 A | 7/2018 |
| JP | 2021523393 A | 9/2021 |
| KR | 20190122123 A | 10/2019 |
| WO | 2019222229 A1 | 11/2019 |
| WO | 2020004705 A1 | 1/2020 |

OTHER PUBLICATIONS

International Search Report and Written Opinion for International Application No. PCT/US2021/054324 mailed Mar. 22, 2022, 23 pages.
Invitation to Pay Additional Fees for International Application No. PCT/US2021/054324, Jan. 27, 2022, 17 pages.
Ji Y., et al., "A Digitally Driven Pixel Circuit with Current Compensation for AMOLED Microdisplays: Digital Drive Pixel Circuit for OLED Microdisplays," Journal of the Society for Information Display, Sep. 2015, 9 pages.
Non-Final Office Action mailed Jun. 10, 2022 for U.S. Appl. No. 17/067,070, filed Oct. 9, 2020, 16 pages.
Non-Final Office Action mailed Nov. 17, 2021 for U.S. Appl. No. 17/067,070, filed Oct. 9, 2020, 11 Pages.
Notice of Allowance mailed Sep. 28, 2022 for U.S. Appl. No. 17/067,070, filed Oct. 9, 2020, 5 pages.
Response to Office Action mailed Sep. 12, 2022 for U.S. Appl. No. 17/067,070, filed Oct. 9, 2020, 10 Pages.
Response to Office Action mailed Feb. 17, 2022 for U.S. Appl. No. 17/067,070, filed Oct. 9, 2020, 10 Pages.
International Preliminary Report on Patentability for International Application No. PCT/US2021/054324, mailed Apr. 20, 2023, 19 pages.
Office Action mailed Feb. 21, 2025 for Korean Application No. 10-2023-7014318, filed Oct. 9, 2021, 6 pages.
Office Action mailed May 22, 2025 for Chinese Application No. 202180069468.4, filed Oct. 9, 2021, 8 pages.
Office Action mailed May 27, 2025 for Japanese Patent Application No. 2023-519675, filed on Oct. 9, 2021, 5 pages.

* cited by examiner

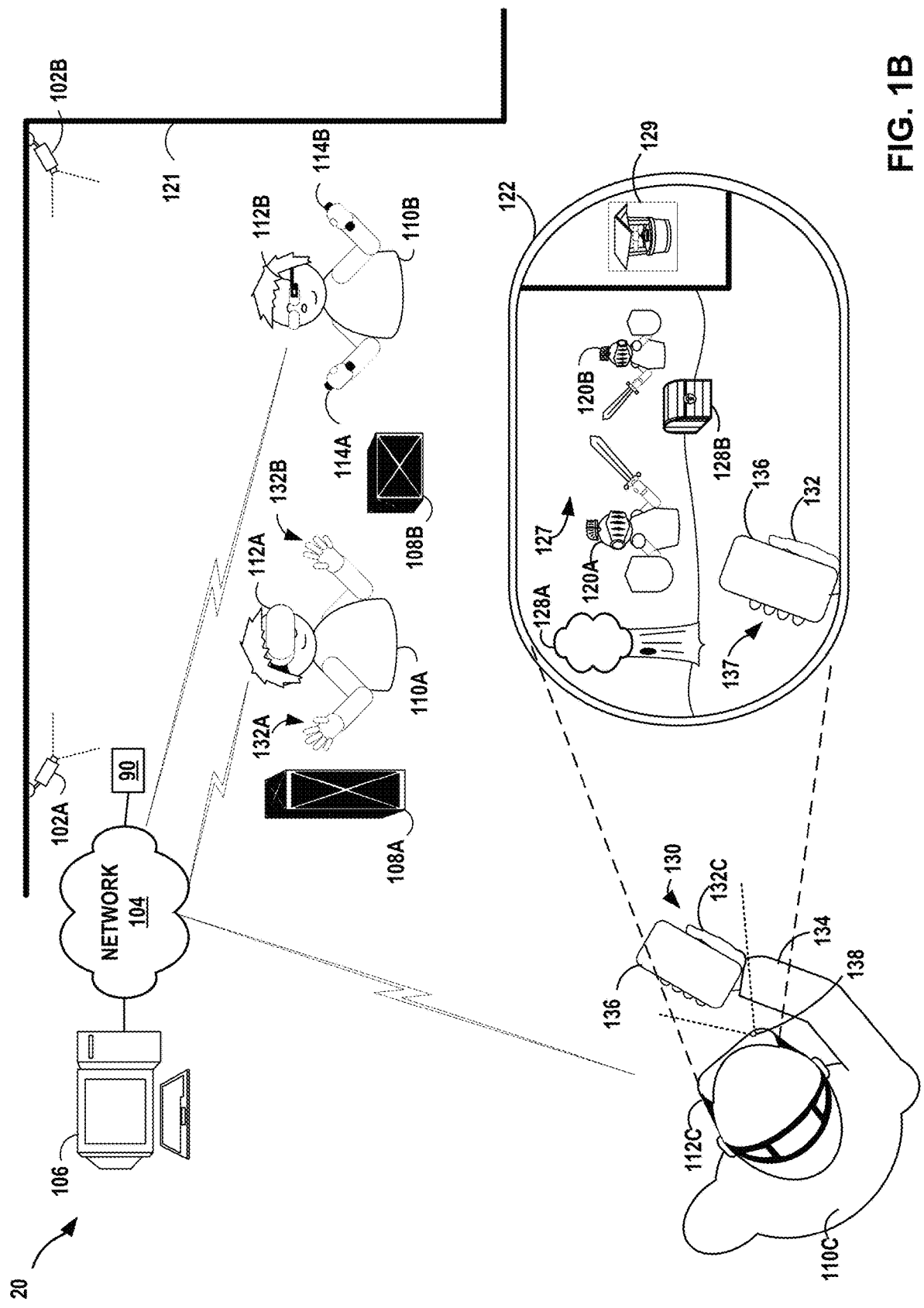

1210 nDrive

| Digital Intensity | Subframe 0 | Subframe 1 | Subframe 2 | Subframe 3 | Subframe 4 | Subframe 5 | Subframe 6 | Subframe 7 |
|---|---|---|---|---|---|---|---|---|
| 000 | 1 | 1 | 1 | 1 | 1 | 1 | 1 | 1 |
| 001 | 0 | 1 | 1 | 1 | 1 | 1 | 1 | 1 |
| 010 | 0 | 0 | 1 | 1 | 1 | 1 | 1 | 1 |
| 011 | 0 | 0 | 0 | 1 | 1 | 1 | 1 | 1 |
| 100 | 0 | 0 | 0 | 0 | 1 | 1 | 1 | 1 |
| 101 | 0 | 0 | 0 | 0 | 0 | 1 | 1 | 1 |
| 110 | 0 | 0 | 0 | 0 | 0 | 0 | 1 | 1 |
| 111 | 0 | 0 | 0 | 0 | 0 | 0 | 0 | 1 |

Total Intensity $n+m$-bits, $n=3$ and $m=2$

| Digital Intensity Level Binary (msb) | Analog Intensity Level 0 (Binary 00) | Analog Intensity Level 1 (Binary 01) | Analog Intensity Level 2 (Binary 10) | Analog Intensity Level 3 (Binary 11) |
|---|---|---|---|---|
| 000 | 00000 | 00001 | 00010 | 00011 |
| 001 | 00100 | 00101 | 00110 | 00111 |
| 010 | 01000 | 01001 | 01010 | 01011 |
| 011 | 01100 | 01101 | 01110 | 01111 |
| 100 | 10000 | 10001 | 10010 | 10011 |
| 101 | 10100 | 10101 | 10110 | 10111 |
| 110 | 11000 | 11001 | 11010 | 11011 |
| 111 | 11100 | 11101 | 11110 | 11111 |

FIG. 12B

ARTIFICIAL REALITY SYSTEMS INCLUDING DIGITAL AND ANALOG CONTROL OF PIXEL INTENSITY

This application is a continuation of U.S. patent application Ser. No. 17/067,070, filed Oct. 9, 2020, the entire content of which is incorporated herein by reference.

TECHNICAL FIELD

This disclosure generally relates to artificial reality systems, such as augmented reality, mixed reality, and/or virtual reality systems, and systems and methods for control of pixel intensity in these and other electronic systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments. Some artificial reality systems utilize specialized integrated circuits, often referred to as a System on a Chip (SoC), having complex functionality for aggregating and processing sensor data, and for displaying the artificial reality content to the user.

SUMMARY

In one example, the disclosure is directed to an artificial reality system comprising a head mounted display (HMD) configured to output artificial reality content, the HMD including at least one display device comprising a plurality of pixels, wherein each of the plurality of pixels comprises: a light emitting element; a digital pixel control circuit that generates a pulse width modulation (PWM) output signal that controls a number of subframes of a frame during which a driving current is provided to the light emitting element; and an analog pixel control circuit that controls a level of the driving current provided to the light emitting element for the frame.

In another example, the disclosure is directed to a display device comprising a plurality of pixels, wherein each of the plurality of pixels comprises: a light emitting element; a digital pixel control circuit that generates a pulse width modulation (PWM) output signal that controls a number of subframes of a frame during which a driving current is provided to the light emitting element; and an analog pixel control circuit that controls a level of the driving current provided to the light emitting element during the frame.

In another example, the disclosure is directed to a method comprising A method comprising generating, with digital pixel control circuitry, a pulse width modulation (PWM) output signal that controls a number of subframes of a frame during which a driving current is provided to a light emitting element of a pixel of a display device; and controlling, with analog pixel control circuitry, a level of the driving current provided to the light emitting element during the frame.

The details of one or more examples are set forth in the accompanying drawings and the description below. Other features will be apparent from the description and drawings, and from the claims.

BRIEF DESCRIPTION OF THE DRAWINGS

FIG. 1B is a block diagram depicting another example multi-device artificial reality system in which an HMD includes digital and analog control of pixel intensity in accordance with techniques described in this disclosure.

FIG. 12A is a table of example values of the nDrive signal generated by the digital pixel control circuit in accordance with techniques described in this disclosure.

FIG. 12B is a table of example total intensity bit values for an n+m-bit control word, where n=3 and m=2.

DETAILED DESCRIPTION

Figure 1A:
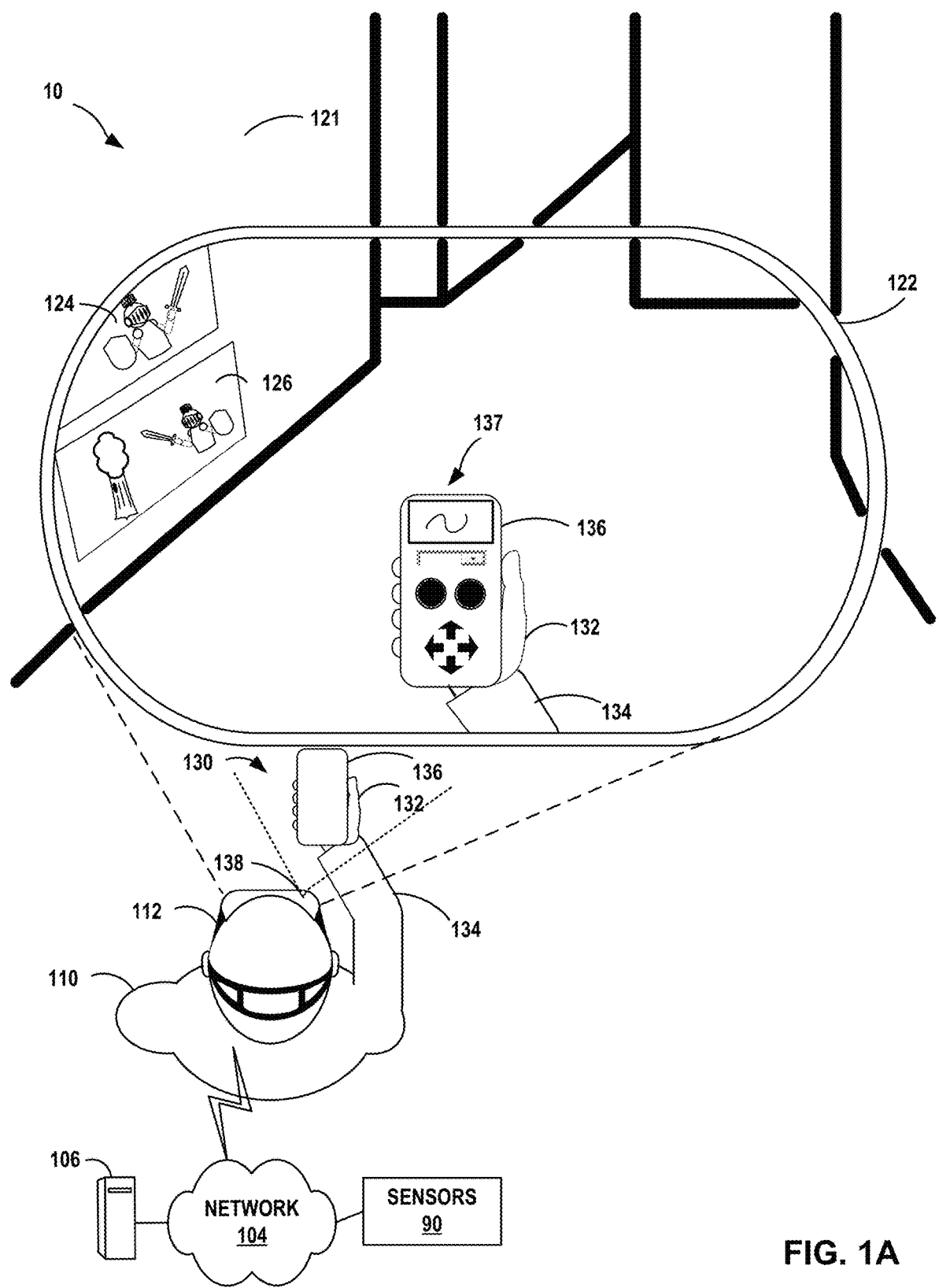
FIG. 1A is a block diagram depicting an example multi-device artificial reality system in which an HMD includes digital and analog control of pixel intensity in accordance with the techniques described in this disclosure.

In electronic display devices, the brightness or intensity level of the light emitting diodes (LEDs) within each pixel of the display may be controlled by either a digital pixel driving scheme or an analog pixel driving scheme. In a digital pulse width modulation (PWM) scheme, each pixel is supplied with a constant current and pixel intensity is controlled by varying the emission time of the pixel based on the bit values of a control word. In an analog scheme, the emission time of each pixel is constant and pixel intensity is controlled by varying the current used to drive the pixel. However, in order to provide n-bits of intensity control in a digital PWM scheme, each pixel requires n 1-bit memory cells to store the pixel intensity values for each frame. The very small display sizes associated with artificial reality systems limit the physical area available for such memory cells. For example, the dimensions of an artificial reality display may be on the order of 2×2 millimeters (mm). Thus, fewer levels of pixel intensity may be available for smaller display sizes due to the reduced number of memory cells that may be fit into each pixel to store the intensity values.

In addition, different LEDs in a display device may emit light at different brightness levels even when they are driven in the same way. This non-uniformity may be due to variations in the manufacturing process, inconsistencies in the display panel assembly, or various other reasons.

In general, in accordance with techniques described in this disclosure, a display device provides for control of the intensity of pixels in the display using a hybrid pixel control circuit that includes a digital pixel control circuit and an analog pixel control circuit within each pixel. The digital pixel control circuit employs digital PWM techniques to control a number of subframes of a frame during which a driving current is provided to the pixel (in other words, the number of subframes within each frame during which the pixel emits light). The analog pixel control circuit controls the level of the driving current supplied to the pixel during the frame. In some examples, the total number of gray scale intensity levels for each pixel is defined by a binary n+m-bit control word, where n-bits define the number of subframes of a frame that a driving current is supplied to the pixel as determined by the digital pixel control circuit and m-bits define the level of the driving current supplied to the pixel by the analog pixel control circuit. The total number of intensity levels for each pixel is thus $2^{n+m}$.

Alternatively, in other examples, n bits may be used by the digital pixel control circuit for digital PWM control of the pixel intensity and m bits may be used by the analog pixel control circuit to control the driving current provided to the light emitting elements in each pixel for non-uniformity compensation.

In some examples, the analog pixel control circuit includes a storage capacitor and a transistor. An input terminal of the storage capacitor is connected to an output terminal of the transistor. In some examples, at the beginning of a frame, the capacitor is charged to a predetermined voltage based on m bits of an n+m-bit control word corresponding to the intensity level of the pixel. During each frame, the voltage stored in the capacitor determines the level of the driving current supplied to the light emitting element in the pixel. In other examples, for each frame, the capacitor is charged to the same predetermined voltage based on m bits of an m-bit control word corresponding to a non-uniformity compensation value for the pixel. The voltage stored in the capacitor determines the level of the driving current supplied to the pixel.

In this way, the hybrid digital and analog pixel driving architecture may provide n+m bits of intensity control, while requiring only n 1-bit memory cells for implementation of the digital pixel control circuit for each pixel. At the same time, the analog pixel control circuit may be implemented using a single capacitor and a single transistor. By providing for n+m bits of intensity control and reducing the number of memory cells required in each pixel, this implementation may be advantageous for very small display sizes. Alternatively, the n-bits provided by the digital pixel control circuit may be used for intensity control and the m-bits provided by the analog pixel control circuit may be used to program the display for non-uniformity compensation.

FIG. 1A is a block diagram depicting an example multi-device artificial reality system in which an HMD includes digital and analog control of pixel intensity in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In some example implementations, as described herein, peripheral device 136 and HMD 112 may each include one or more System on a Chip (SoC) integrated circuits configured to support an artificial reality/virtual reality application, such as SoCs operating as co-application processors, sensor aggregators, display controllers, etc.

In accordance with the techniques of this disclosure, HMD 112 includes digital and analog control of pixel intensity. For example, HMD 112 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

FIG. 1B is a block diagram depicting another example multi-device artificial reality system in which an HMD includes digital and analog control of pixel intensity in accordance with techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications.

In accordance with the techniques of this disclosure, any of HMDs 112A, 112B and/or 112C include digital and analog control of pixel intensity. For example, any of HMDs 112 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

Figure 2A:
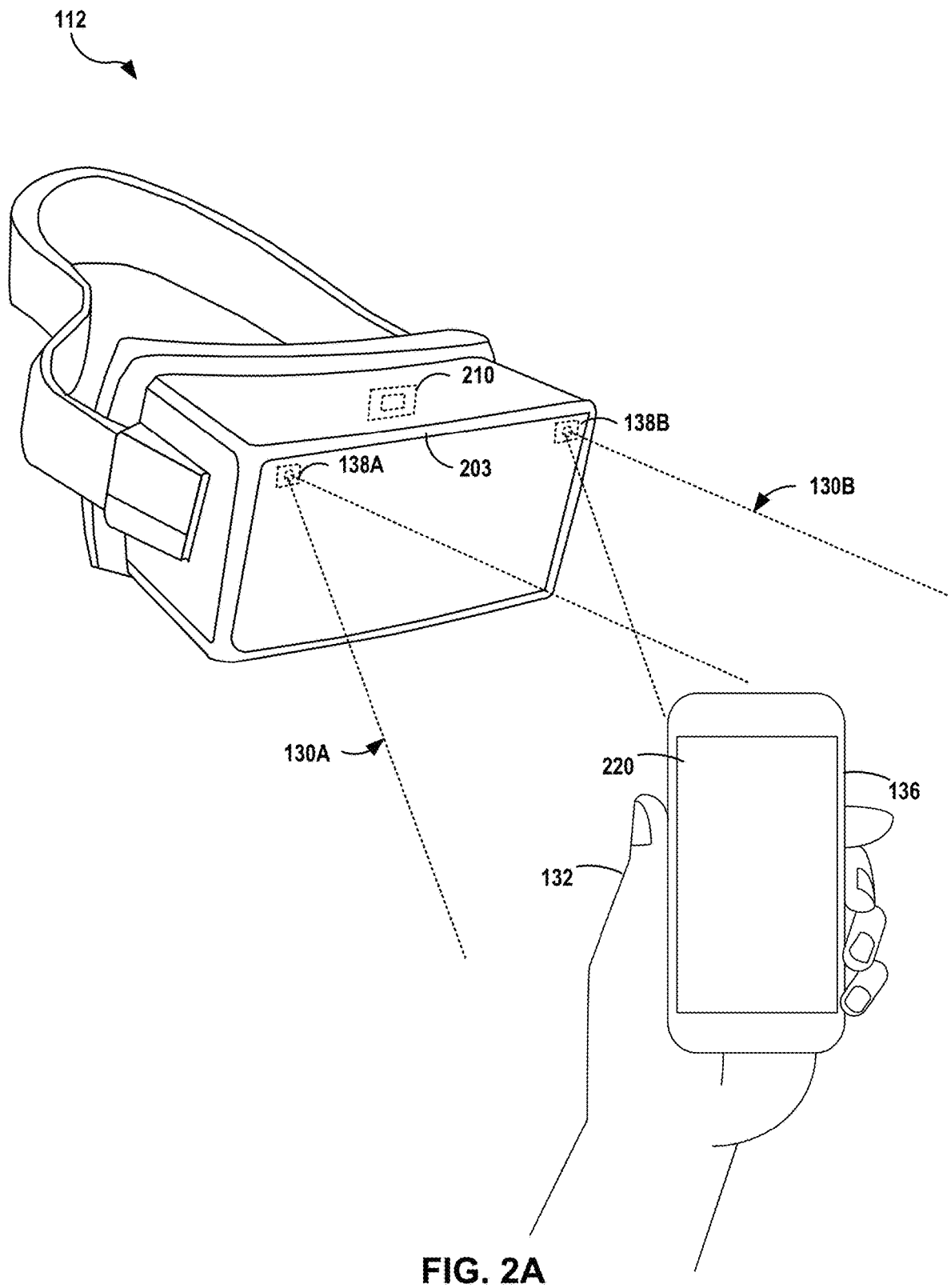
FIG. 2A is a block diagram depicting an example HMD that includes digital and analog control of pixel intensity and an example peripheral device in accordance with techniques described in this disclosure.

FIG. 2A is a block diagram depicting an example HMD 112 that includes digital and analog control of pixel intensity and an example peripheral device in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial reality system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In accordance with the techniques of this disclosure, HMD 112 of FIG. 2A includes digital and analog control of pixel intensity. For example, HMD 112 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

Figure 2B:
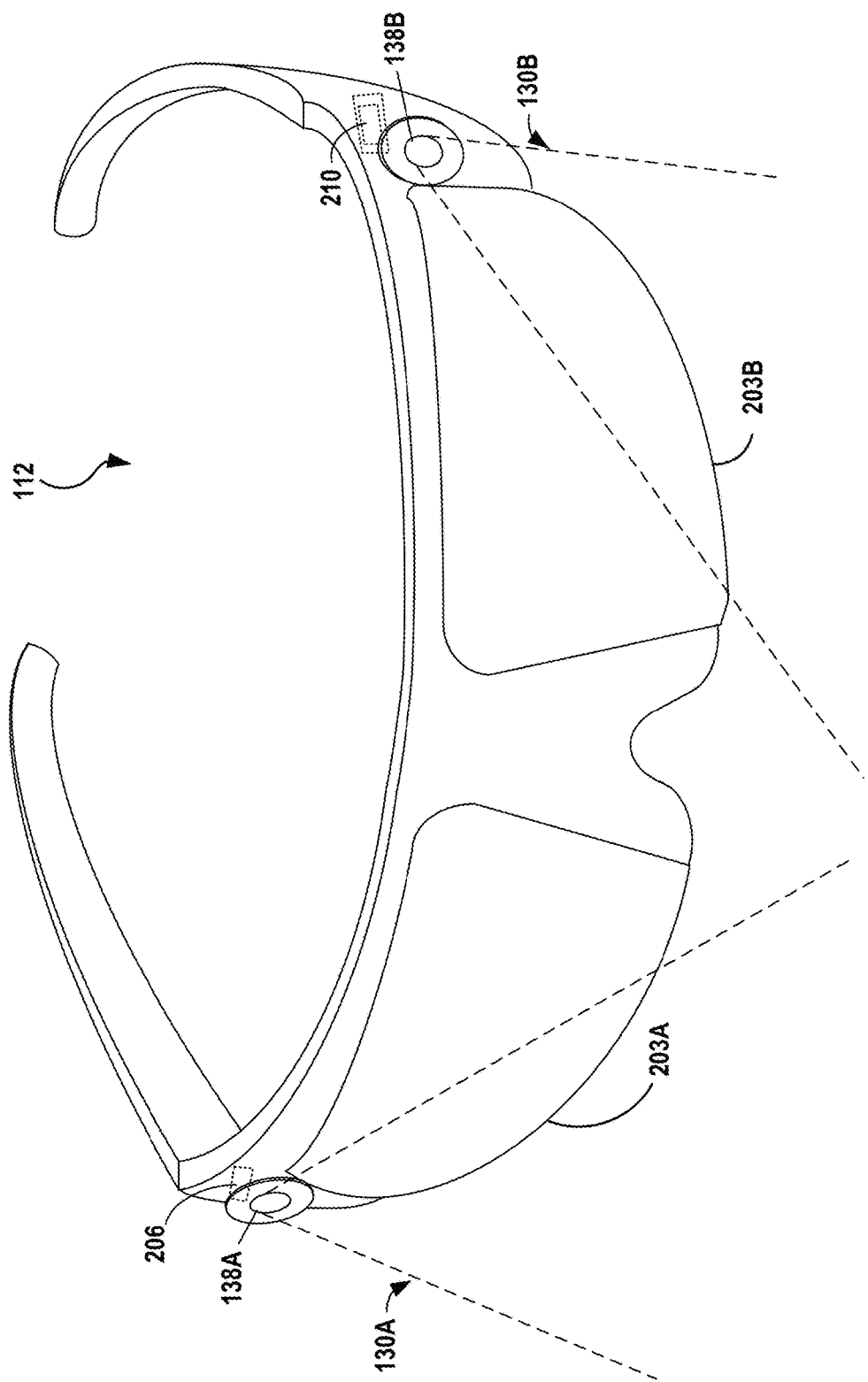
FIG. 2B is a block diagram depicting another example HMD that includes digital and analog control of pixel intensity, in accordance with techniques described in this disclosure.

FIG. 2B is a block diagram depicting another example HMD 112 that includes digital and analog control of pixel intensity, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

In accordance with the techniques of this disclosure, HMD 112 of FIG. 2B includes digital and analog control of pixel intensity. For example, HMD 112 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

Figure 3:
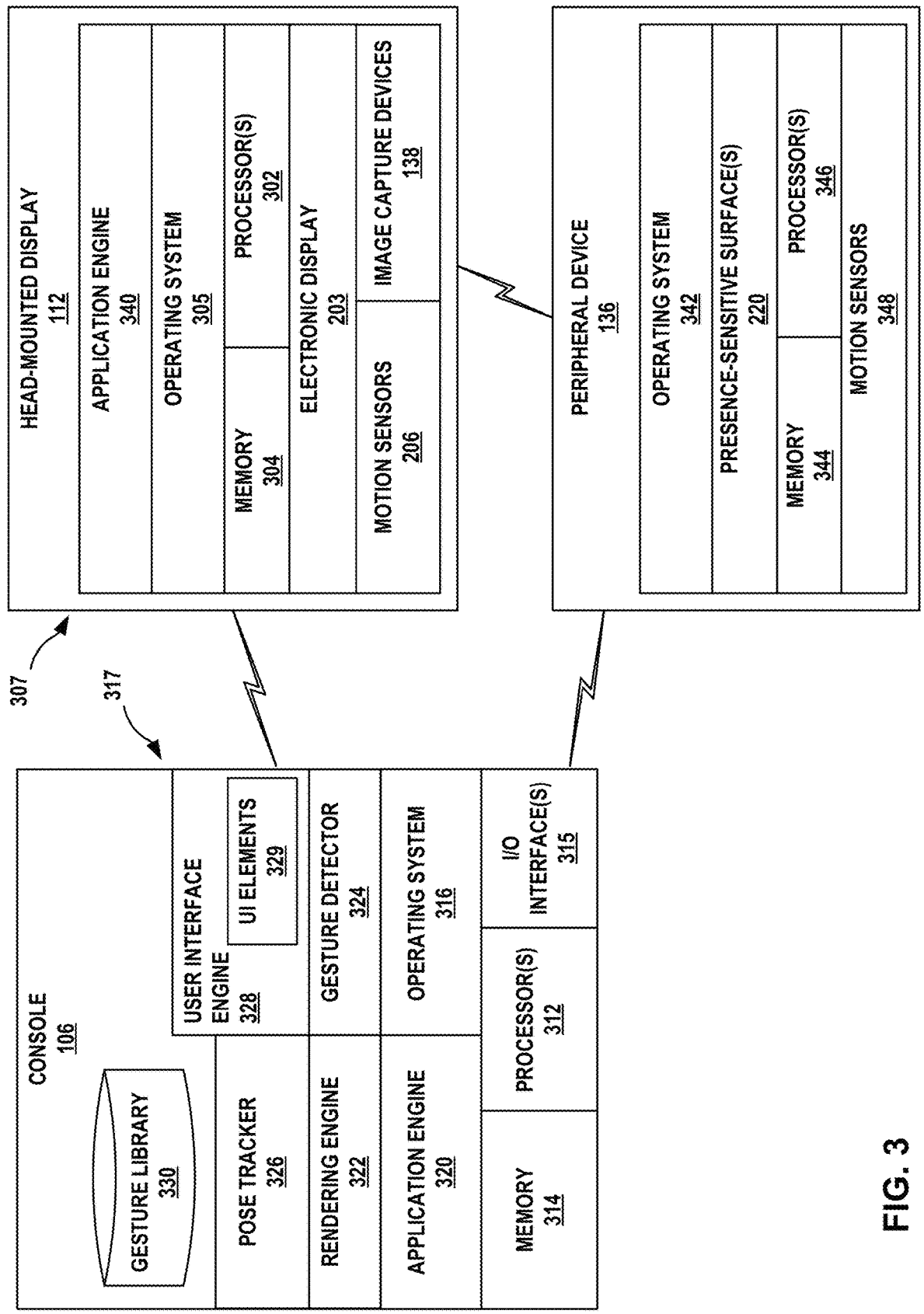
FIG. 3 is a block diagram showing example implementations of a console, an HMD that includes digital and analog control of pixel intensity, and a peripheral device of the multi-device artificial reality systems of FIGS. 1A, 1B, in accordance with techniques described in this disclosure.

FIG. 3 is a block diagram showing example implementations of a console 106, an HMD 112 that includes digital and analog control of pixel intensity, and a peripheral device 136 of the multi-device artificial reality systems 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software components 317 of console 106 operate to provide an overall artificial reality application. In this example, software components 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software components 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUS) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques of this disclosure, any of electronic display(s) 203 of HMD 112 of FIG. 3 may include digital and analog control of pixel intensity. For example, any one or more of electronic display(s) 203 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

Figure 4:
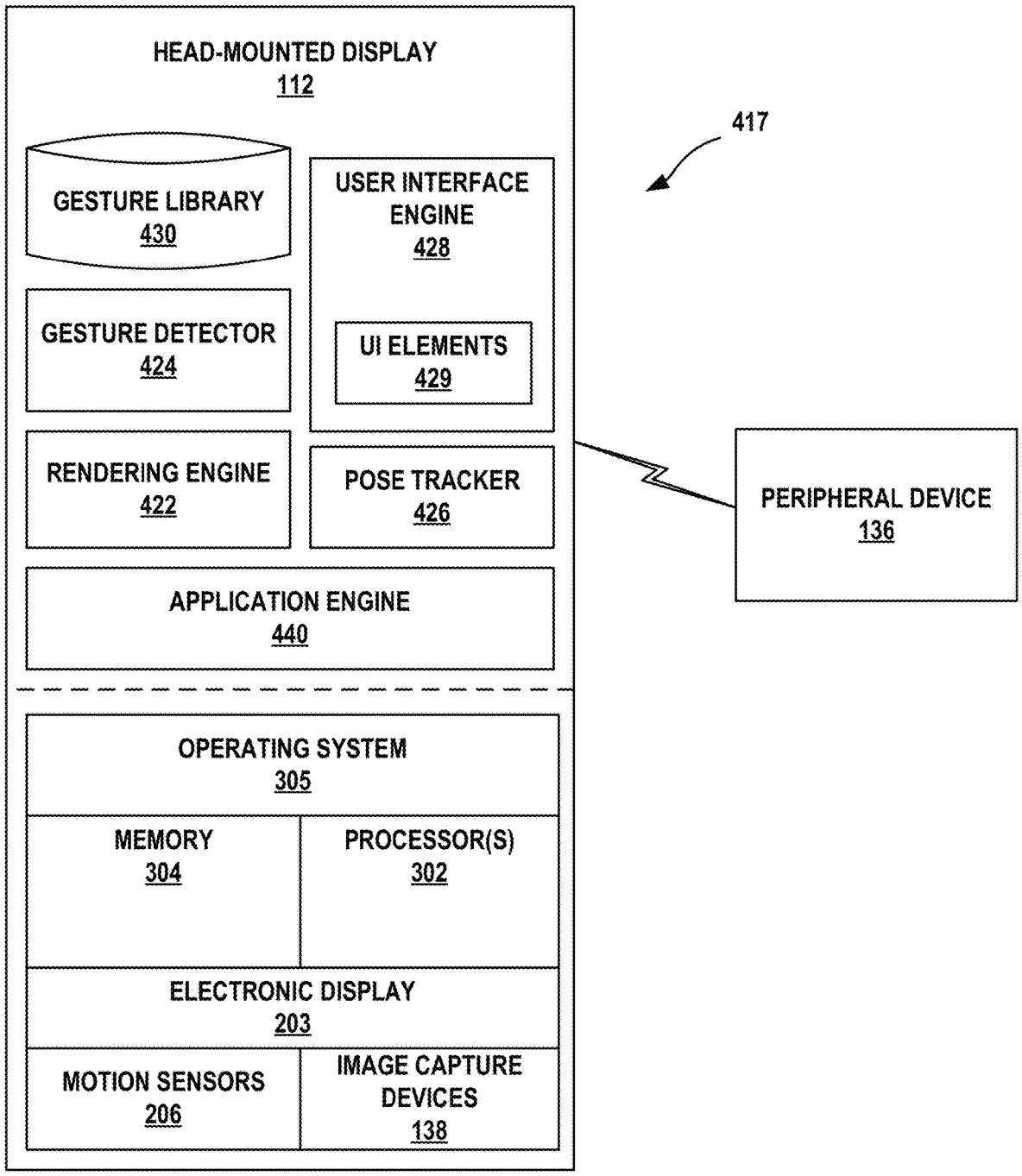
FIG. 4 is a block diagram depicting an example in which gesture detection, user interface generation, and virtual surface functions are performed by the HMD of the artificial reality systems of FIGS. 1A, 1B, and in which the HMD includes digital and analog control of pixel intensity in accordance with the techniques described in this disclosure.

FIG. 4 is a block diagram depicting an example in which gesture detection, user interface generation, and virtual surface functions are performed by the HMD 112 of the artificial reality systems of FIGS. 1A, 1B, and in which the HMD includes digital and analog control of pixel intensity in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Components of peripheral device 136 in FIG. 4 may operate similarly to components of peripheral device 136 in FIG. 3. The techniques described with respect to FIG. 3 with respect to digital and analog control of pixel intensity may also be implemented in HMD 112. For example, any one or more of electronic display(s) 203 may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

Figure 5:
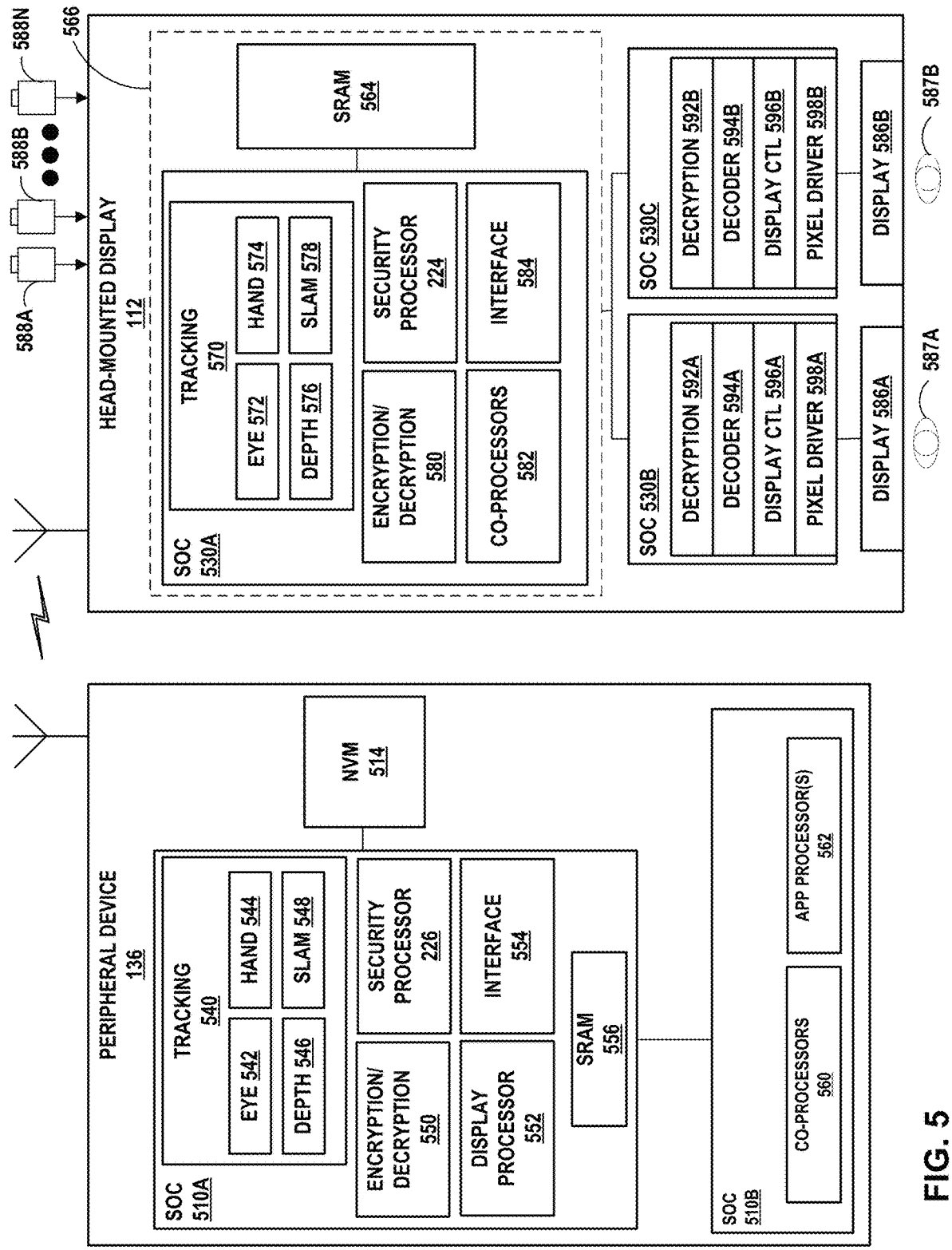
FIG. 5 is a block diagram illustrating an example implementation of a distributed architecture for a multi-device artificial reality system in which one or more display devices include digital and analog control of pixel intensity according to techniques of this disclosure.

FIG. 5 is a block diagram illustrating a more detailed example implementation of a distributed architecture for a multi-device artificial reality system in which one or more devices (e.g., peripheral device 136 and HMD 112) are implemented using one or more SoC integrated circuits within each device. FIG. 5 illustrates an example in which HMD 112 operates in conjunction with peripheral device 136. Peripheral device 136 represents a physical, real-world device having a surface on which multi-device artificial reality systems 100 or 126 overlay virtual content. Peripheral device 104 may include one or more presence-sensitive surface(s) 204 for detecting user inputs by detecting a presence of one or more objects (e.g., fingers, stylus, etc.) touching or hovering over locations of presence-sensitive surfaces) 204. In some examples, peripheral device 104 may have a form factor similar to any of a smartphone, a tablet computer, a personal digital assistant (PDA), or other handheld device. In other examples, peripheral device 104 may have the form factor of a smartwatch, a so-called "smart ring," or other wearable device. Peripheral device 104 may also be part of a kiosk or other stationary or mobile system. Presence-sensitive surface(s) 204 may incorporate output components, such as display device(s) for outputting visual content to a screen. As described above, HMD 102 is architected and configured to enable the execution of artificial reality applications.

In this example, HMD 112 and peripheral device 136 includes SoCs 530, 510 (respectively) that represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. A more detailed example is shown in FIG. 5. FIG. 5 is merely one example arrangement of SoC integrated circuits. The distributed architecture for a multi-device artificial reality system may include any collection and/or arrangement of SoC integrated circuits.

In this example, SoC 530A of HMD 112 comprises functional blocks including tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 of SoC 530A is a functional block to encrypt outgoing data communicated to peripheral device 136 or a security server and decrypt incoming data communicated from peripheral device 136 or a security server. Co-application processors 582 includes one or more processors for executing instructions, such as a video processing unit, graphics processing unit, digital signal processors, encoders and/or decoders, and/or others.

Interface 584 of SoC 530A is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

SoCs 530B and 530C of HMD 112 each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

In accordance with the present disclosure, each of pixel drivers 598A and 598B of SoCs 530B and 530C, respectively, may include a hybrid pixel control circuit including a digital pixel control circuit and an analog pixel control circuit within each pixel. In some examples, the digital pixel control circuit and analog pixel control circuit provide for n+m bits of gray scale intensity control for each pixel. Alternatively, n bits may be used by the digital pixel control circuit for digital PWM control of the gray scale pixel intensity and m bits may be used by the analog pixel control circuit to control a driving current provided to the pixel for non-uniformity compensation.

In this example, peripheral device 136 includes SoCs 510A and 510B configured to support an artificial reality application. In this example, SoC 510A comprises functional blocks including tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 of SoC 510A encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Display processor 552 of SoC 510A includes one or more processors such as a video processing unit, graphics processing unit, encoders and/or decoders, and/or others, for rendering artificial reality content to HMD 112. Interface 554 of SoC 510A includes one or more interfaces for connecting to functional blocks of SoC 510A. As one example, interface 584 may include peripheral component interconnect express (PCIe) slots. SoC 510A may connect with SoC 510B using interface 584.

SoC 510A may connect with one or more communication devices (e.g., radio transmitter) using interface 584 for communicating with other devices, e.g., HMD 112.

SoC 510B of peripheral device 136 includes co-application processors 560 and application processors 562. In this example, co-application processors 560 includes various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 136.

Figure 6:
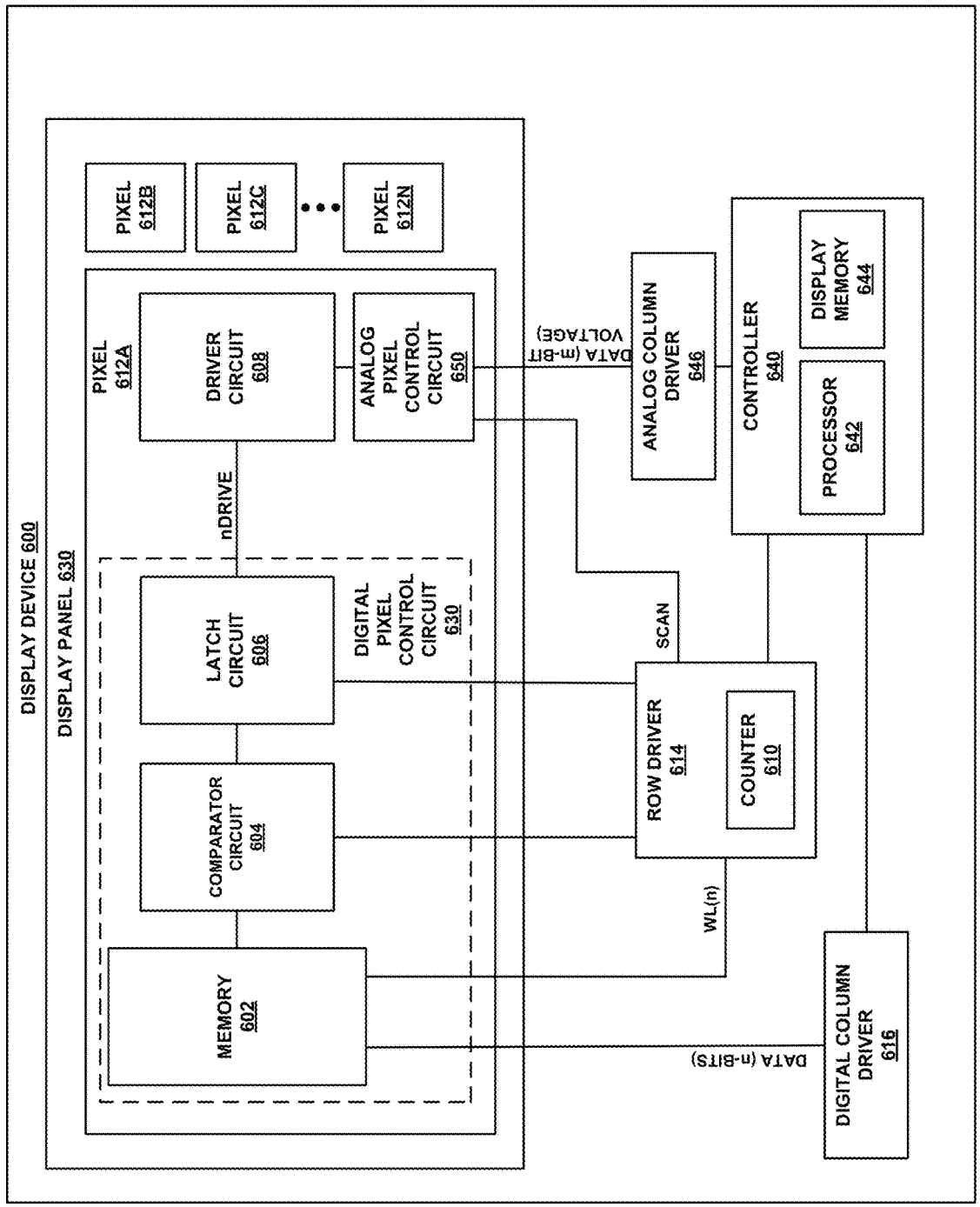
FIG. 6 is a block diagram of a display device including a digital pixel control circuit and an analog pixel control circuit in accordance with techniques described in this disclosure.

FIG. 6 is a block diagram of a display device 600, in accordance with techniques described in this disclosure. Display device 600 may be used to implement, for example, any of the displays shown and described with respect to FIGS. 1-5. The display device 600 includes a display panel 630 including multiple pixels 612A-612N (collectively referred to as "pixels 612" or individually as "pixel 612"). FIG. 6 illustrates a detailed structure for controlling a pixel 612A, but other pixels 612B-612N may have the same control structure as pixel 612A. A pixel driver circuit 608 in each pixel 612 includes a light emitting element, such as a light emitting diode (LED) or micro-LED, which outputs light having an intensity controlled by a digital pixel control circuit 630 and an analog pixel control circuit 650. In some examples, the pixel intensity for each frame is defined by an n+m-bit control word. Digital pixel control circuit 630 provides for n-bits of digital PWM control of the light emitted by the light emitting element of the pixel 612. Analog pixel control circuit 650 provides for control of $2^m$ different levels of the driving current supplied to the light emitting element of pixel 612. In some examples, the digital pixel control circuit 630 and analog pixel control circuit 650 provide for n+m bits of intensity control for each pixel. Alternatively, n bits may be used by the digital pixel control circuit 630 for digital PWM control of the pixel intensity and m bits may be used by the analog pixel control circuit 650 to control the driving current provided to the pixel for non-uniformity compensation.

In the example of FIG. 6, digital pixel control circuit 630 includes a memory 602, a comparator circuit 604, and a latch circuit 606. Memory 602 is connected to the comparator circuit 604. Comparator circuit 604 is connected to latch circuit 606, and latch circuit 606 is connected to driver circuit 608. Analog pixel control circuit 650 is also connected to driver circuit 608.

Display device 600 further includes a row driver 614 including a counter 610, a digital column driver 616, an analog column driver 646 and a controller 640. In some embodiments, controller 640 may be separate from the display device 600. Although FIG. 6 shows row driver 614, digital column driver 616 and analog column driver 646 as being connected to pixel 612A, they are in fact connected to each of the pixels 612A-612N. Specifically, row driver 614 is connected to memory 602, comparator circuit 604, and latch circuit 606 of digital pixel control circuit 630. Row driver 614 is further connected with analog pixel control circuit 650. Digital column driver 616 is connected to memory 602 of digital pixel control circuit 630. Controller 640 includes processing circuitry such as a processor 642 and a display memory 644. Controller 640 is connected to row driver 614, digital column driver 616 and also to analog column driver 646.

Digital column driver 616 loads the n digital bits of the n+m intensity control word to the memory cells in memory 602 of each pixel while analog column driver 646 loads a single voltage corresponding to m-bits of the n+m bit intensity control word to the analog pixel control circuit 650. Row driver 614 controls when the programming phase for digital analog control circuit 630 and the programming phase for analog pixel control circuit 650 starts and ends (see, e.g., FIG. 10). Analog and digital loading schemes are controlled by separated components/transistors (i.e., digital pixel control circuit 630 and analog pixel control circuit 650) meaning that the analog and digital control of each pixel are completely independent of each other. Thus, the digital and analog intensity control provided by the techniques of the present disclosure is flexible in that the analog intensity control and the digital intensity control may be loaded in any order (that is, the analog may be loaded first and the digital loaded second or the digital may be loaded first and the analog loaded second), or the analog and digital may be loaded at the same time. The selection of the order may be based on, for example, the desired performance of the pixel and/or on whether the analog scheme is used for intensity control or for uniformity compensation.

Memory 602 of the example digital pixel control circuit 630 may include n-bits of digital data storage, such as n 1-bit static random-access memory (SRAM) memory cells, or some other type of memory cells. Memory 602 is connected to row driver 614 via word lines and connected to the column driver 616 via a bit line and an inverse bit line. Memory 602 receives from the row driver 614 signals for word lines (WL) for memory cell selection, and receives from the column driver 616 control words in the form of n data bits D for writing to the selected memory cells. The bit values of the n data bits define the number of subframes in each frame during which a driving current is supplied to the light emitting element within the pixel. The number of data bits, n, in the digital pixel control circuit may vary. In one example, the memory 602 stores n=3 bits to provide eight gradations of brightness (e.g., 000, 001, 010, 011, 100, 101, 110, 111) that are controlled by digital pixel control circuit 630. In another example, n=5 to provide for thirty-two gradations of brightness that are controlled by digital pixel control circuit 630. It shall be understood that n may be any integer number of bits appropriately suited to the particular implementation, and that the disclosure is not limited in this respect. Additional details regarding the memory 602 are discussed in connection with FIG. 7.

Row driver 614 may include a counter 610 for each pixel row or groups of pixel rows. The counter 610 is at least partially embodied using a circuit to generate bit values of count bits. The number of count bits corresponds with the number of data bits, n, in the control word for the digital pixel control circuit. In the example where n=3, the counter 610 generates a sequence of for each subframe of a frame including bit values 000, 001, 010, 011, 100, 101, and 111. Here, the counter 610 counts from 0 to 7 in binary to generate the sequence. In some embodiments, the counter 610 inverts each count bit to facilitate comparison by the comparator circuit 604.

In one example implementation, comparator circuit 604 of the example digital pixel control circuit 630 receives the count bits from the row driver 614 generated by the counter 610 and receives the n data bits of the control word from the memory 602, and compares the count bits with the data bits to generate a comparison result. The comparison result is generated based on a NOR of each data bit AND corresponding count bit as defined by Equation 1:

$$(!count[0]\ \&\ D[0])|(!count[1]\ \&\ D[1])|\ldots|(!count[n-1]\ \&\ D[n-1]) \qquad \text{Eq. (1)}$$

where !count[x] is the xth inverse count bit, D[x] is the xth data bit of the control word, and n is the length of the control word and count bits. The comparison defined by Equation 1 is an ordered comparison of corresponding data bits and count bits, which allows for a simplified comparator circuit 604. The comparator circuit 604 includes a dynamic comparison node that switches between a high and low level according to the comparison result, and outputs the comparison result to the latch circuit 606.

Latch circuit 606 of the example digital pixel control circuit 630 receives the comparison result from the comparator circuit 604, and generates a gate signal for a driving transistor of the driver circuit 608. The latch circuit 606 retains the desired state of the gate signal sent to the driver circuit 608 even while there may be switching of the comparison result at the dynamic comparison node of the comparator circuit 604. The output of latch circuit 606 is a control signal, nDrive, which controls switching of the driver circuit 608 as described herein.

Driver circuit 608 includes a light emitting element, such as an LED or micro-LED, and a driving transistor having a terminal (e.g., source or drain) connected to the LED. The driving transistor further includes a gate terminal connected to the latch circuit 606 to receive the gate signal (nDrive) for control of current flow through the source and drain terminals of the driving transistor and the LED. In this way, the driving transistor acts as a switch to control whether current is supplied to the LED based on the PWM timing determined by the n bits of the control word provided to the digital pixel control circuit 630. Additional details regarding the driver circuit 608 are discussed below in connection with FIGS. 8 and 9.

In some embodiments, the control circuitry of the pixels, including driver circuit 608, digital pixel control circuit 630, and at least some portions of analog pixel control circuit 650 are arranged in a thin-film-transistor (TFT) layer of display device 600.

Row driver 614 and digital column driver 616 control operation of the digital pixel control circuit 630 within each pixel 612A-612N. For example, column driver 616 provides the n data bits of the n+m-bit control word for pixel 612A to memory 602, which are programmed into n corresponding memory cells of memory 602 based on selection by the word lines (WL) from row driver 614.

Controller 640 includes processing circuitry, such as one or more processor(s) 642 (referred to herein generally as processor 642) and a display memory 644. Processor 642 provides control signals to row driver 614 and digital column driver 616 to control operation of the digital pixel control circuit 630. Processor 642 also provides control signals to row driver 614 and analog pixel control circuit 650 to control the amount or level of the driving current supplied to each pixel during a frame.

In some examples, when m bits are used for analog non-uniformity compensation, display memory 644 (also referred to herein as a "data storage device") may store an m-bit non-uniformity compensation value for each pixel. The m-bit non-uniformity compensation value may be stored as a corresponding analog voltage in analog pixel control circuit 650 (such as in a capacitor or other analog storage device) to control the amount or level of the driving current supplied to the pixel by analog pixel driving circuit 650 for non-uniformity compensation.

Examples of circuits for digital PWM control of pixel intensity that may be used to implement digital pixel control circuit 630 are shown and described in U.S. application Ser. No. 16/779,168 filed on Jan. 31, 2020 and entitled, "Pulse Width Modulation for Driving Pixel Using Comparator," U.S. application Ser. No. 16/779,206 filed on Jan. 31, 2020 and entitled, "Row Based Brightness Calibration," and U.S. Provisional Application No. 62/800,979 filed on Feb. 4, 2019 and entitled, "Pulse Width Modulation for Driving Pixel Using Comparator," each of which is incorporated by reference in its entirety. However, it shall be understood that other implementations for digital PWM control of pixel intensity may also be used, and that the disclosure is not limited in this respect.

Figure 7:
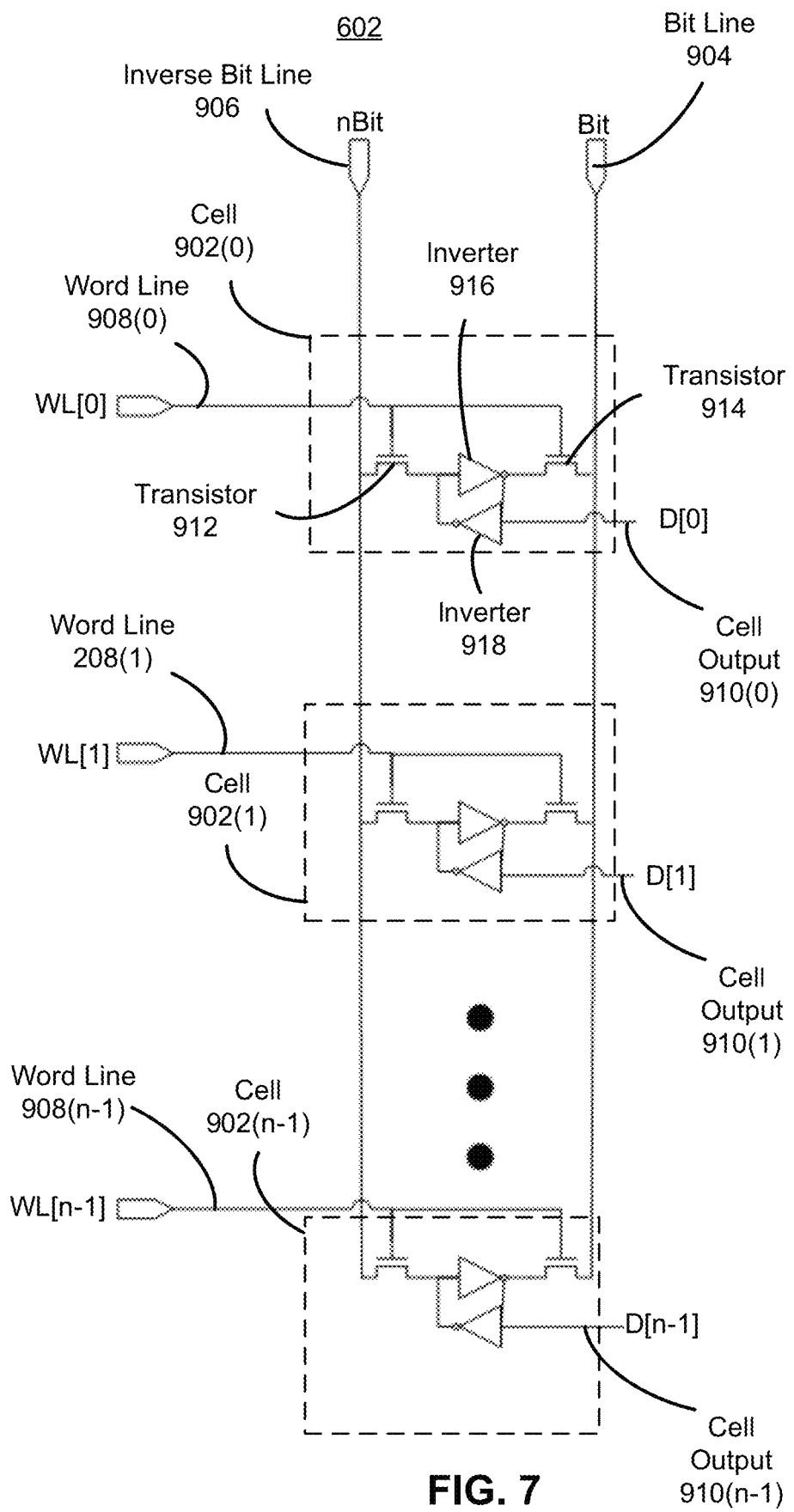
FIG. 7 is a circuit diagram illustrating a memory for a pixel in accordance with techniques described in this disclosure.

FIG. 7 is a circuit diagram illustrating an example memory 602 of digital pixel control circuit 630 of an individual pixel 612, in accordance with techniques described in this disclosure. In particular, a portion of example memory 602 for a single pixel 612 is shown. Memory 602 stores the n bits of the pixel intensity control word and outputs the n bits of the control word to the comparator circuit 604. The memory 602 includes n 1-bit memory cells 902(0) through 902(n−1), where n is the bit length of the control word for the digital pixel control circuit 630. Each cell 902(0) through 902(n−1) is connected to row driver 614 via a respective word line 908(0) through 908(n−1), and further connected to the column driver 616 via a bit line 904 and inverse bit line 906. Each cell 902(0) through 902(n−1) further includes a respective cell output 910(0) through 910(n−1) to output a bit value stored in the cell to the comparator circuit 604.

Each cell 902(0)-902(n−1) may be implemented using, for example, a 1-bit SRAM memory cell; however, it shall be understood that memory cells 902(0)-902(n−1) may be implemented using any suitable type of memory cells.

With reference to the cell 902(0), each cell 902(0)-902(n−1) may include a transistor 912, a transistor 914, and cross coupled inverters 916 and 918. In this example, the transistors 912 and 914 are NMOS transistors. The transistor 912 includes a first terminal connected to the inverse bit line 906 and a second terminal connected to a first node of formed by the cross coupled inverters 916 and 918. The transistor 914 includes a first terminal connected to the bit line 904, and another terminal connected to a second node formed by the cross coupled inverters 916 and 918. The gate terminals of the transistors 912 and 914 are each connected to the word line 908(0). The second node formed by the cross coupled inverters 916 and 918 is connected to the cell output 910(0).

To program the cell 902(0) with a bit value, the word line 908(0) of the cell 902(0) is set to a high signal, the bit line 904 is set to the bit value, and the inverse bit line 906 is set to an inverse of the bit value. This results in the bit value on the bit line 904 being stored in the cell 902(0), and being output at the cell output 910(0). The other cells of the memory 602 may include similar components and operation as discussed herein for the cell 902(0). The memory 602 receives signals WL[0] through WL[n−1] via the respective word lines 908(0) through 908(n−1), signal Bit from the bit line 904, and signal nBit from the inverse bit line 906 to store the n-bit control words, and outputs the bit values of the n-bit control words via cell outputs 910(0) through 910(n−1). For each frame, the memory 602 stores a control word and outputs the control word via the cell outputs 610(0) through 610(n−1) as data signals D[0] through D[n−1].

Figure 8:
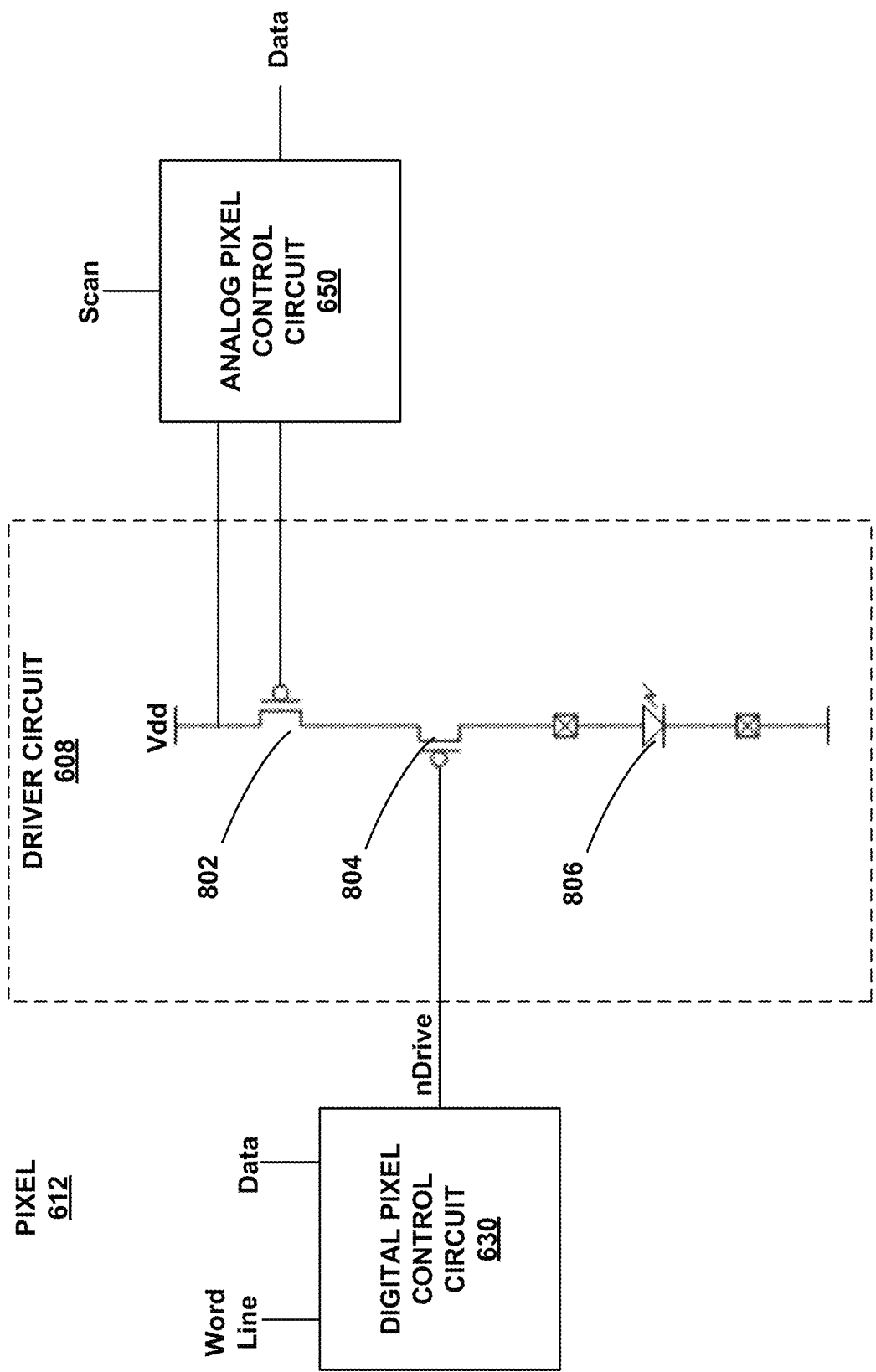
FIG. 8 is a circuit diagram illustrating a digital pixel control circuit, an analog pixel control circuit, and a driver circuit of an example pixel in accordance with techniques described in this disclosure.

FIG. 8 is a circuit diagram illustrating an example driver circuit 608 of an individual pixel 612, connected to a digital pixel control circuit 630 and an analog pixel control circuit 650 in accordance with techniques described in this disclosure. The example driver circuit 608 includes a current driving transistor 802 and a switch transistor 804. In this example, driving transistor 802 and switch transistor 804 are PMOS transistors. However, it shall be understood that driver circuit 608 could be implemented using NMOS transistors, with the arrangement of circuit elements adjusted accordingly, and that the disclosure is not limited in this respect. A first terminal of switch transistor 804 is connected to an output terminal of driving transistor 802, and a second terminal of switch transistor 804 is connected to a light emitting diode (LED) 806. In some embodiments, LED 806 is a micro-LED. An input terminal of driving transistor 802 is connected to a node formed by a connection of a supply signal bias (e.g., a voltage source, Vdd) and a first output of analog pixel control circuit 650. A control terminal (e.g., gate) of transistor 802 is connected to a second output of analog pixel control circuit 630. A control terminal (e.g., gate) of switch transistor 804 receives a control signal (nDrive) from digital pixel control circuit 630.

Figure 9:
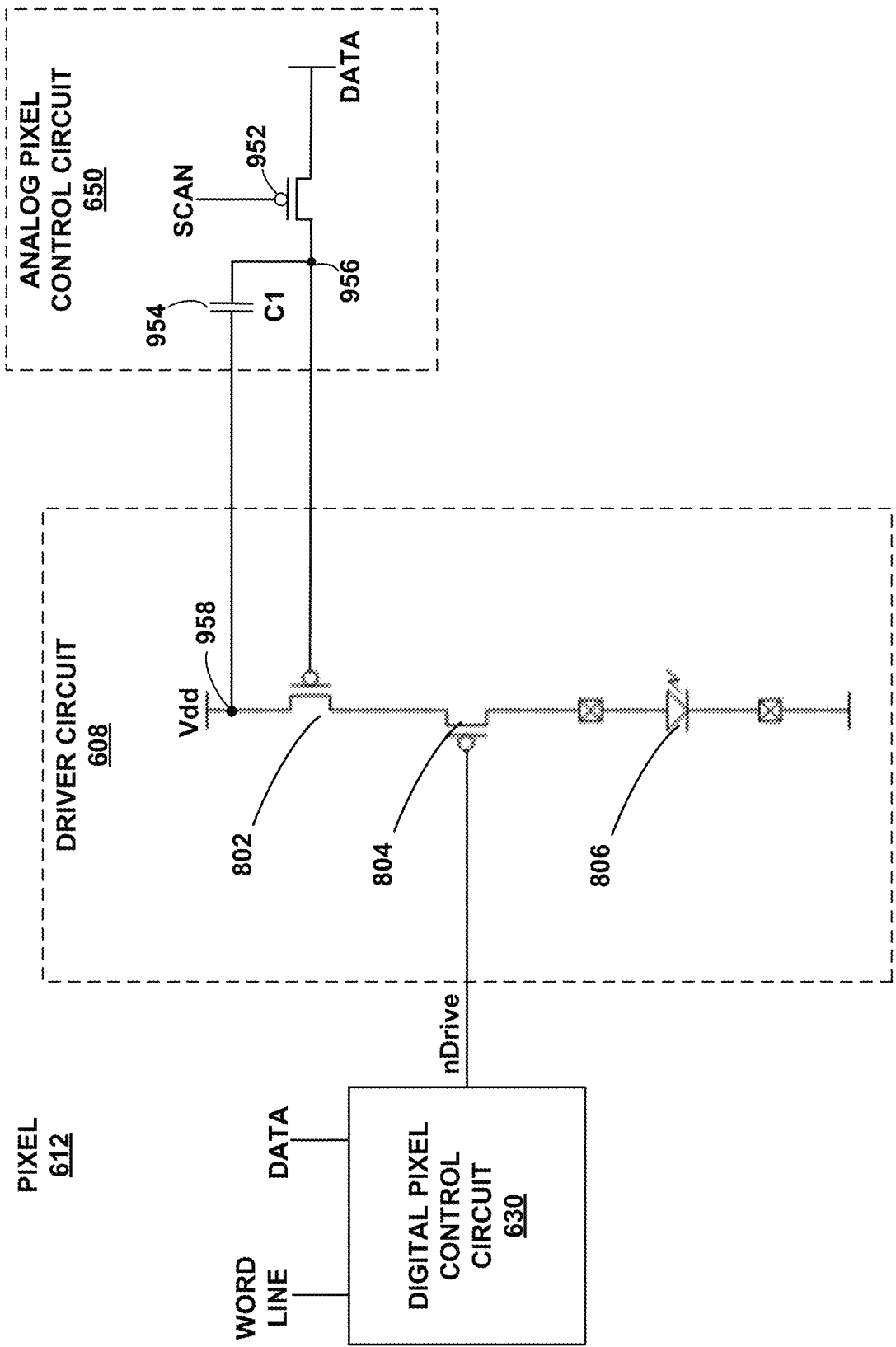
FIG. 9 is a circuit diagram illustrating more detailed example implementations of a digital pixel control circuit, an analog pixel control circuit, and a driver circuit of an example pixel in accordance with techniques described in this disclosure.

FIG. 9 is a circuit diagram illustrating an example pixel 612 including digital pixel control circuit 630, driver circuit 608 and an example implementation of analog pixel control circuit 650 in accordance with techniques described in this disclosure. Example analog pixel control circuit 650 includes a storage capacitor 954 and a transistor 952. In this example, transistor 952 is a PMOS transistor. However, it shall be understood that analog pixel control circuit 650 may be implemented using an NMOS transistor, with the arrangement of circuit elements adjusted accordingly, and that the disclosure is not limited in this respect. Storage capacitor 954 includes an input terminal connected to a first node 956 formed by a connection between the output terminal of transistor 952 and the control terminal of driving transistor 802 of driver circuit 608. Storage capacitor 954 further includes an output terminal connected to a second node 958 formed by a connection between the input terminal of the driving transistor 802 of the driver circuit 608 and a voltage source (Vdd). In other words, storage capacitor 954 is connected between the input terminal and the control terminal of current driving transistor 802 such that a voltage stored in storage capacitor 954 may control the amount of current flowing through current driving transistor 802.

Analog pixel control circuit 650 is connected to receive two inputs, a Scan signal from row driver 614 and a Data signal from analog column driver 646 (see FIG. 6). Transistor 952 includes a control terminal (e.g., gate) connected to receive the Scan signal, and an input terminal connected to receive the Data input signal. When pixel 612 is selected by the Scan signal input, analog pixel control circuit 650 receives an analog control voltage ("Data" in FIG. 9) for the pixel based on m-bits of an n+m-bit control word corresponding to the desired intensity level of the pixel. Transistor 952 is turned on, charging storage capacitor 954 to a desired driving voltage based on the analog control voltage corresponding to the pixel intensity for the frame. The driving voltage is the voltage required to drive the LED with a current level that will, in combination with the n-bits of intensity control provided by digital pixel control circuit 630, result in the gray scale intensity indicated by the n+m control word. Once the capacitor is charged and the nDrive signal provided by digital pixel control circuit 630 turns on switch transistor 804, transistor 802 is biased by the voltage stored in storage capacitor 954. This bias voltage stored in capacitor 954 controls the current level supplied by transistor 802, through transistor 804 and ultimately to LED 806. In this way, analog pixel control circuit 650 controls the amount or level of current supplied to LED 806 of pixel 612 by controlling the voltage stored in storage capacitor 954.

Figure 10A:
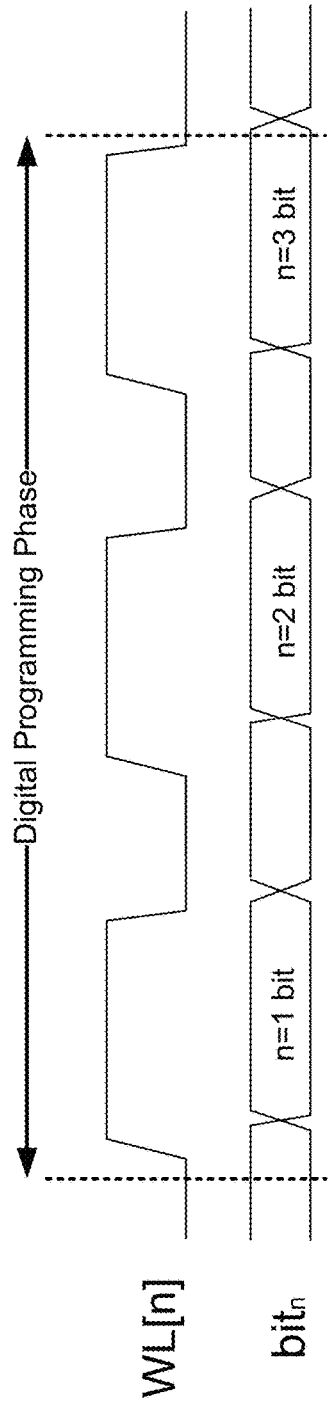
FIG. 10A is a diagram showing the digital programming phase of a digital pixel control circuit and FIG. 10B is a diagram showing the analog programming phase of an analog pixel control circuit in accordance with techniques described in this disclosure.
Figure 10B:
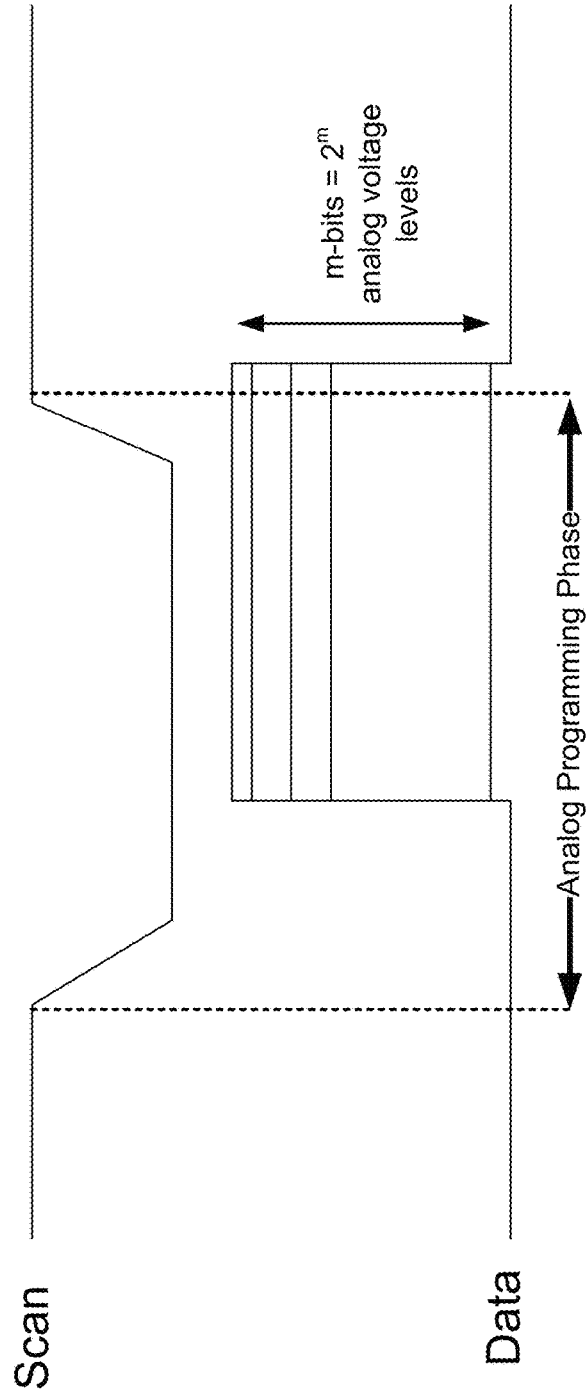

FIG. 10A is a diagram showing the digital programming phase of the digital pixel control circuit 630, and FIG. 10B is a diagram showing the analog programming phase of the analog pixel control circuit 650. It shall be understood that the digital and analog programming phases shown in FIGS. 10A and 10B are completely independent of each other, and that FIGS. 10A and 10B are not intended to convey a timing relationship between the digital and analog programming phases. Instead, the timing of the digital and analog programming phases may be selected based on the design considerations of the system as further described herein.

The digital programming phase (FIG. 10A) is controlled by the write or word line (WL(n)) signal. When the WL signal is enabled (goes high in this example) the memory cell of the digital pixel control circuit 630 corresponding to that bit location is programmed. In the n=3 bit example of FIG. 10a, a first memory cell (such as cell 902(0) of FIG. 7) is programmed with the value of the $bit_n$ signal during the first WL(n) enabled time window, a second memory cell (such as memory cell 902(1) of FIG. 7) is programmed with the value of the bite signal during the second WL(n) enabled time window, and a third memory cell (such as memory cell 902(2) of FIG. 7) is programmed with the value of the bite signal during the third WL(n) enabled time window.

The analog programming phase (FIG. 10B) is independent of the digital programming phase and is controlled by the Scan signal. When the Scan signal is active (goes low in this example), the analog pixel control circuit 650 is enabled, and an analog voltage having one of $2^m$ different voltage levels corresponding to the m-bits of analog intensity is stored in the storage capacitor (e.g., C1) of analog pixel control circuit 650. The length of the analog programming phase (the time during which the Scan signal is active) depends upon the size of the analog voltage(s) to be stored and the capacitance of the storage capacitor in the analog pixel control circuit 650. In general, the length of the analog programming phase must be sufficient to charge the capacitor to the highest voltage level ($2^m$) defined by the m-bits of analog intensity.

For both the digital programming phase and the analog programming phase, to prevent corruption of the data stored in the digital pixel control circuit and/or the incorrect voltage being stored in the analog pixel control circuit, the $bit_n$ and Data lines cannot change until after the corresponding programming window has ended, that is, until the WL(n) signal goes low or the Scan signal goes high in this example.

As mentioned above, the digital programming phase of the digital pixel control circuit 650 as shown in FIG. 10A and the analog programming phase of the analog pixel control circuit 630 as shown in FIG. 10B are independent of one another. The user may decide an appropriate timing relationship between the digital and analog programming phases depending upon one or more factors.

For example, when the analog pixel control circuit 650 is used for non-uniformity compensation, the analog programming phase (FIG. 10B) may be selected to occur before the digital programming phase (FIG. 10A) of a frame. In such an example, the analog voltage to which the capacitor is programmed (charged) is fixed due to the measurements taken at the time of calibration. Therefore, in the non-uniformity compensation example, the level at which to charge the capacitor for each pixel is the same for every frame. In addition, depending upon the compensation voltages and the size of the capacitor, the capacitor may be selected such that the capacitor does not need to be charged during every frame. Rather, the capacitor may be charged every other frame or every preselected number of frames.

The timing of the charging of the capacitor may also be charged so as to overlap with a dead time during the frame.

In another example, when analog pixel control circuit 650 is used to provide m additional bits of gray scale intensity control, corresponding to $2^m$ possible voltage levels, the digital programming phase (FIG. 10A) may be selected to begin before the analog programming phase (FIG. 10B) of a frame. In such an example, the analog voltage to which the capacitor is programmed (charged) may be different on a frame-by-frame basis, and therefore the capacitor needs to be charged each frame. The analog programming phase may begin after the start of the digital programming phase such that the charging of the capacitor may overlap with the digital programming phase. In this example, the overall programming phase (digital+analog) is shorter due to overlapping of the charging of the capacitor with the digital programming phase. Also, because the start and end of a frame is entirely controlled by the digital control circuitry, the timing for the frame is generally more accurate and reliable.

In some examples, the WL(n) and Scan signals generated by row driver 614 (see FIG. 6) and received by the digital pixel control circuit 630 and the analog pixel control circuit 650, respectively, may be implemented using only the same signal. For example, the WL(n) signal may also be sent to the analog pixel control circuit 630 instead of a separate Scan signal. This may be useful when analog pixel control circuit 650 is used to provide m additional bits of gray scale intensity control, such that the analog programming phase begins at the same time and overlaps with the digital programming phase. In this example, the timing of the WL(n) signal would be designed such that there is sufficient time to charge the capacitor of the analog pixel control circuit to the voltage corresponding to the m bits of analog intensity. In the example of FIG. 10, for example, the total time that the WL(n) signal is inactive (low) would be designed to be sufficient to charge the capacitor to the voltage corresponding to the m bits of analog intensity.

Figure 11A:
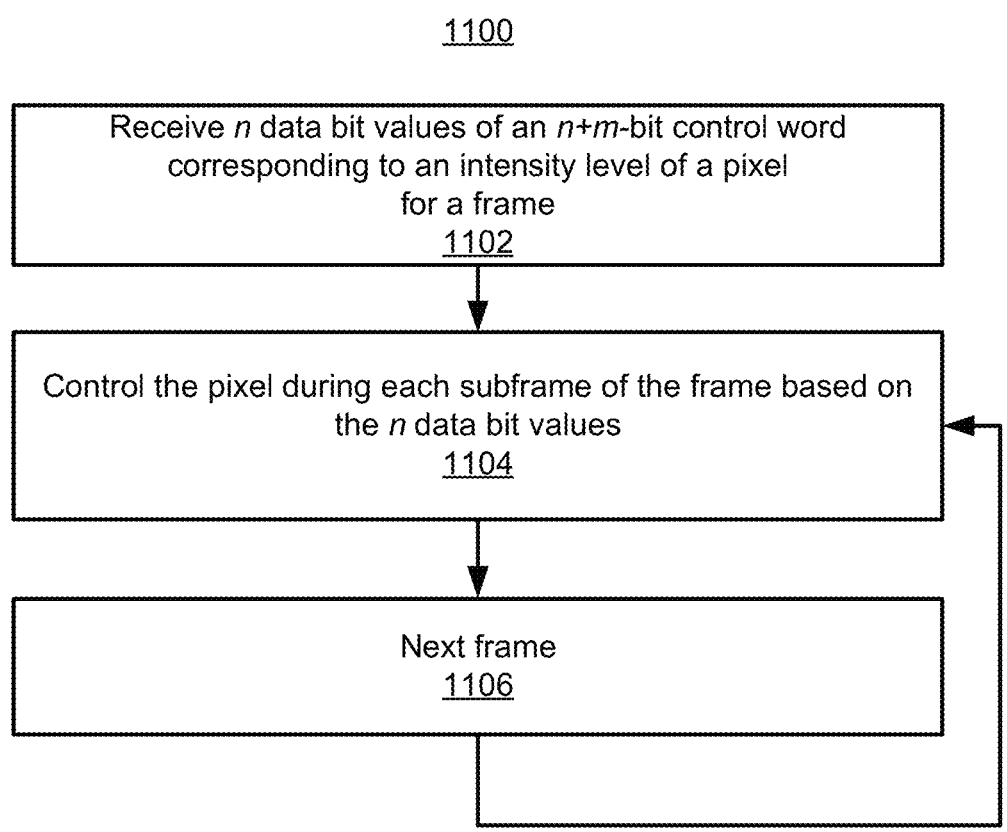
FIG. 11A is a flowchart illustrating an example process for digital PWM control of a pixel of a display device in accordance with techniques described in this disclosure.

FIG. 11A is a flowchart illustrating an example process (1100) for digital PWM control of a pixel of a display device, in accordance with techniques described in this disclosure. Example process (1100) may be executed by digital pixel control circuit 630 to control a number of subframes of a frame during which a driving current is provided to the light emitting element within the pixel, and thus to control the number of subframes within the frame that pixel 612 emits light. The process (1100) may have fewer or additional steps, and steps may be performed in different orders or in parallel.

The digital pixel control circuit 630 receives n data bit values of an n+m-bit control word corresponding to an intensity level of the pixel for the frame (1102). Digital pixel control circuit 630 controls each light emitting element in the pixel during each subframe of the frame based on the n data bit values (1104). For example, the n data bit values determine the number of subframes in the frame that the driving current is supplied to the light emitting element within the pixel. The digital pixel control circuit 630 then repeats the process for the next successive frame (1106).

FIG. 12A is a table of example values (1210) of the nDrive signal that may be generated by the digital pixel control circuit 630, where n=3, in accordance with techniques described in this disclosure. At the first digital intensity level (000), the nDrive signal is high during the first subframe (Subframe 0) with the result that the pixel is turned off for all subframes of the frame (in other words, the nDrive signal is at a high level for all subframes of the frame). At the second digital intensity level (001), the nDrive signal is low during the first subframe (Subframe 0) and then goes high in the second subframe meaning that the pixel is turned on (i.e., the driving current is supplied to the light emitting element within the pixel) for the first subframe only and turned off for all remaining subframes of the frame. A similar result occurs for each successive digital intensity level, until the highest digital intensity level (111) is reached in which the pixel is turned on for all subframes except the last subframe (Subframe 7) of the frame.

Figure 11B:
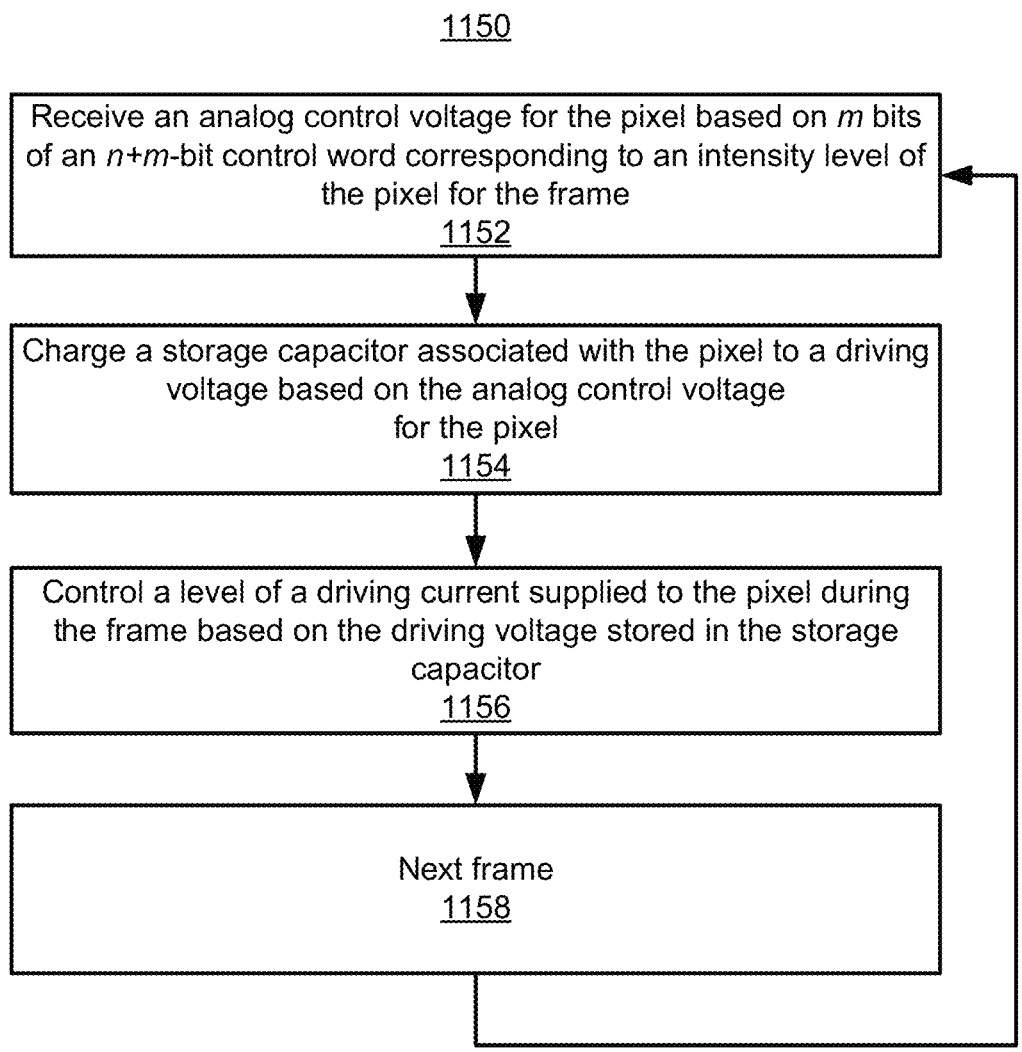
FIG. 11B is a flowchart illustrating an example process for analog control of a current level supplied to a pixel of a display device in accordance with techniques described in this disclosure.

FIG. 11B is a flowchart illustrating an example process (1150) for analog control of a current level supplied to a pixel of a display device, in accordance with techniques described in this disclosure. Example process (1150) may be executed by analog pixel control circuit 650 to control the amount of current supplied to a pixel of the display device. The process (1150) may have fewer or additional steps, and steps may be performed in different orders or in parallel.

At the beginning of a frame, analog pixel control circuit 650 receives an analog control voltage for the pixel based on m-bits of an n+m-bit control word corresponding to the desired intensity level of the pixel (1152). Analog pixel control circuit charges a storage capacitor to a driving voltage based on the analog control voltage (1154). The driving voltage is the voltage required to drive the LED with a current level that will result in the intensity indicated by the m-bits of the n+m control word. Once the capacitor is charged, the analog pixel control circuit 650 controls a level of the driving current supplied to the LED of the pixel during the frame based on the driving voltage stored in the capacitor (1156). The analog pixel control circuit 650 then repeats the process for the next successive frame (1158).

Figure 11C:
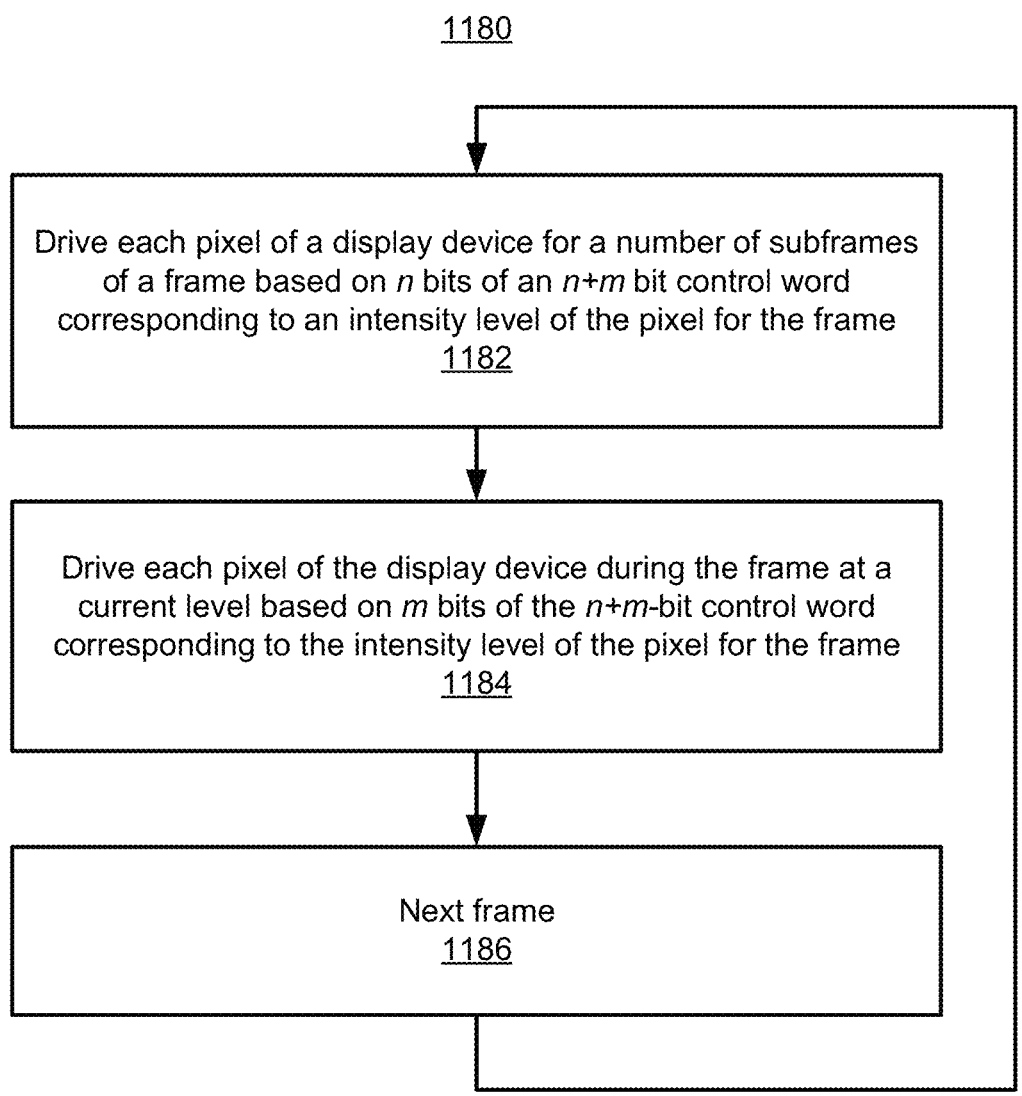
FIG. 11C is a flowchart illustrating an example process for digital PWM control of a pixel of a display device in combination with analog control of a current level supplied to the pixel in accordance with techniques described in this disclosure.

FIG. 11C is a flowchart illustrating an example process (1180) for digital PWM control of a pixel of a display device in combination with analog control of a current level supplied to the pixel, in accordance with techniques described in this disclosure.

Example process (1180) may be executed by digital pixel control circuit 630 and analog pixel control circuit 650 to control the number of subframes of a frame that a driving current is supplied to the pixel (i.e., the number of subframes that the pixel is turned on) and to control the amount or level of the driving current supplied to the pixel during the frame. The process (1180) may have fewer or additional steps, and steps may be performed in different orders or in parallel.

Digital pixel control circuit 630 drives each pixel of a display device for a number of subframes of a frame based on n bits of an n+m-bit control word corresponding to an intensity level of the pixel for the frame (1182). Analog pixel control circuit 650 drives each pixel of a display device at a current level based on m bits of the n+m-bit control word corresponding to the intensity level of the pixel for the frame (1184). The driving current is supplied to the pixel for all subframes of the frame. The process (1180) then repeats for the next successive frame (1186).

FIG. 12B shows a table 1220 illustrating example total intensity bit values for an n+m-bit control word, where n=3 and m=2. The n-bit or 3-bit digital intensity values are shown in the first column of table 1220. The m-bit or 2-bit analog intensity values are shown in the top row of table 1220. In this example, the total number of intensity values is $2^{n+m}=2^5=32$ possible intensity values as shown in the table. In this example, the n digital intensity bits are assigned as the most significant bits of the n+m-bit control word and the m analog intensity bits were assigned as the least significant bits of the n+m-bit control word. However, it shall be understood that the most significant bits and the least significant bits could be assigned differently, and that the disclosure is not limited in this respect. For example, in other examples, the n digital intensity bits may be assigned as the least significant bits of the n+m-bit control word and the m analog intensity bits may be assigned as the most significant bits of the n+m-bit control word.

Figure 13:
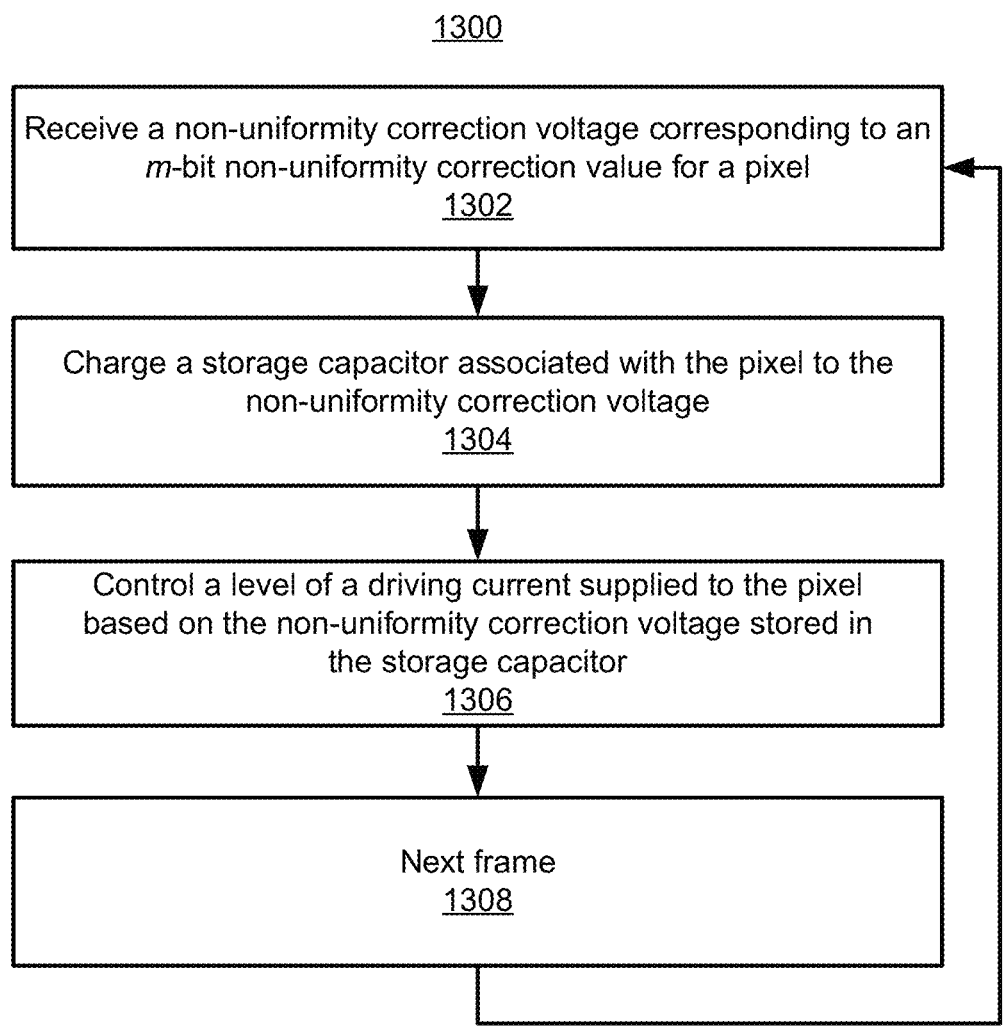
FIG. 13 is a flowchart illustrating a process for brightness uniformity compensation of a pixel in a display device using an analog pixel control circuit in accordance with techniques described in this disclosure.

FIG. 13 is a flowchart illustrating a process (1300) for brightness uniformity compensation in a display device using analog pixel control circuit 650, in accordance with techniques described in this disclosure. The process (1300) may have fewer or additional steps, and steps may be performed in different orders or in parallel.

At the beginning of a frame, analog pixel control circuit 650 receives a non-uniformity correction voltage corresponding to an m-bit non-uniformity correction value for the pixel (1302). The m-bit non-uniformity correction value may be determined during calibration at the time of manufacture and/or at any other time during the lifetime of the display device. Analog pixel control circuit 650 charges a storage capacitor associated with the pixel to a non-uniformity correction voltage based on the m-bit non-uniformity correction value (1304). Analog pixel control circuit 650 controls a level of a driving current supplied to the pixel during the frame based on the non-uniformity correction voltage stored in the storage capacitor (1306). At the end of the frame, analog pixel control circuit 650 may repeat the process with the next successive frame (1308). However, for non-uniformity correction, the non-uniformity correction voltage for each pixel would not necessarily change with each frame. Rather, once the m-bit non-uniformity correction value for a particular pixel is determined, the same non-uniformity correction value would be used during each frame to determine the value of the non-uniformity correction voltage stored in the storage capacitor associated with the pixel. In other words, the non-uniformity correction value for each pixel would remain constant for each frame until such time as the display is recalibrated. Each pixel may have the same or different non-uniformity correction value as other pixels in the display.

The non-uniformity calibration for brightness adjustment can be performed at various times. In one example, the calibration may be performed during a manufacturing step. An optical system may be used to measure the relative brightness of each pixel, or a circuit measuring system may be used to measure the driving current for the LED(s) of each pixel. Each set of colors may have its own set of measured non-uniformity values. Based on the non-uniformity values measured for each pixel, an m-bit non-uniformity correction value may be generated for each pixel to improve brightness uniformity in the display. The m-bit non-uniformity correction value for each pixel may then be used to generate the non-uniformity correction voltage for the storage capacitor associated with the pixel, which is then used to generate the appropriate driving current to the pixel. In another example, alternatively or in addition, the calibration may be performed at some other time, such as at one or more times during the lifetime of display device as LED performance degrades.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The invention claimed is:

1. A display device comprising a plurality of pixels, wherein each of the plurality of pixels comprises:
a light emitting element; and
an analog pixel control circuit that controls a level of a driving current provided to the light emitting element during two or more subframes of a frame, wherein the analog pixel control circuit comprises a storage capacitor configured to be charged to a driving voltage controlled by m bits of an n+m-bit control word, wherein the driving voltage controls the level of the driving current provided to the light emitting element during the two or more subframes of the frame, and wherein the n+m-bit control word corresponds to a desired intensity level of a pixel for the frame and the m bits of the n+m-bit control word corresponds to a non-uniformity correction value.

2. The display device of claim 1 wherein the level of driving current controlled by the analog pixel control circuit comprises the m bits of the n+m-bit control word.

3. The display device of claim 1, wherein each of the plurality of pixels further comprises a digital pixel control circuit, wherein the digital pixel control circuit generates a pulse width modulation (PWM) output signal that controls a number of subframes of the frame during which the driving current is provided to the light emitting element.

4. The display device of claim 3, wherein the PWM output signal generated by the digital pixel control circuit comprises n bits of the n+m-bit control word.

5. The display device of claim 1, wherein each of the plurality of pixels further comprises a pixel driver circuit, the pixel driver circuit comprising:
  a first transistor having a first control terminal connected to receive a pulse width modulation (PWM) output signal from a digital pixel control circuit, a first input terminal, and a first output terminal connected to provide the driving current to the light emitting element; and
  a second transistor having a second output terminal connected to the first input terminal of the first transistor, a second input terminal connected to a node formed by a connection between a voltage source and an output terminal of the storage capacitor, and a second control terminal connected to an input terminal of the storage capacitor.

6. The display device of claim 5, wherein the analog pixel control circuit further comprises:
  a third transistor having a third control terminal connected to receive a scan signal, an output terminal connected to a node formed by the connection between the input terminal of the storage capacitor and the second control terminal of the second transistor, and an input terminal connected to receive a control voltage corresponding to the m bits of the n+m-bit control word corresponding to the desired intensity level of the pixel for the frame.

7. An artificial reality system comprising:
  a head mounted display (HMD) configured to output artificial reality content, the HMD including at least one display device comprising a plurality of pixels, wherein each of the plurality of pixels comprises:
    a light emitting element; and
    an analog pixel control circuit that controls a level of a driving current provided to the light emitting element during two or more subframes of a frame, wherein the analog pixel control circuit comprises a storage capacitor configured to be charged to a driving voltage controlled by m bits of an n+m-bit control word, wherein the driving voltage controls the level of the driving current provided to the light emitting element during the two or more subframes of the frame, and wherein the n+m-bit control word corresponds to a desired intensity level of a pixel for the frame and the m bits of the n+m-bit control word corresponds to a non-uniformity correction value.

8. The artificial reality system of claim 7, wherein the level of the driving current controlled by the analog pixel control circuit comprises the m bits of the n+m-bit control word.

9. The artificial reality system of claim 7, wherein each of the plurality of pixels further comprises a digital pixel control circuit that generates a pulse width modulation (PWM) output signal that controls a number of subframes of the frame during which the driving current is provided to the light emitting element.

10. The artificial reality system of claim 9, wherein the digital pixel control circuit generates the PWM output signal based on n bits of the n+m-bit control word.

11. The artificial reality system of claim 7, wherein n is greater than m.

12. The artificial reality system of claim 7, wherein n is an integer between 5 and 10 and m is an integer between 2 and 5.

13. The artificial reality system of claim 7, wherein a number of intensity levels defined by the n+m-bit control word is $2^{n+m}$.

14. The artificial reality system of claim 7, wherein each of the plurality of pixels further comprises a pixel driver circuit, the pixel driver circuit comprising:
  a first transistor having a first control terminal connected to receive a pulse width modulation (PWM) output signal from a digital pixel control circuit, a first input terminal, and a first output terminal connected to provide the driving current to the light emitting element; and
  a second transistor having a second output terminal connected to the first input terminal of the first transistor, a second input terminal connected to a node formed by a connection between a voltage source and an output terminal of the storage capacitor, and a second control terminal connected to an input terminal of the storage capacitor.

15. The artificial reality system of claim 14, wherein the analog pixel control circuit further comprises:
  a third transistor having a third control terminal connected to receive a scan signal, an output terminal connected to a node formed by the connection between the input terminal of the storage capacitor and the second control terminal of the second transistor, and an input terminal connected to receive a control voltage corresponding to the m bits of the n+m-bit control word corresponding to the desired intensity level of the pixel for the frame.

16. The artificial reality system of claim 14, wherein the first transistor and the second transistor are of a same type.

17. The artificial reality system of claim 14, wherein the first transistor and the second transistor are p-type transistors.

18. A method comprising:
  controlling, with analog pixel control circuitry of each pixel of a plurality of pixels included in a display device, a level of a driving current provided to a light emitting element of a respective pixel of the plurality of pixels included in the display device during two or more subframes of a frame, wherein controlling the level of the driving current comprises:
  charging a storage capacitor of the analog pixel control circuitry to a driving voltage controlled by m bits of an n+m-bit control word, wherein the n+m-bit control word corresponds to a desired intensity level of the respective pixel for the frame and the m bits of the n+m-bit control word corresponds to a non-uniformity correction value; and controlling the level of the driving current provided to the light emitting element during the two or more subframes of the frame based on the driving voltage stored in the storage capacitor.

19. The method of claim 18, further comprising:
generating, with digital pixel control circuitry of each pixel of the plurality of pixels included in the display device, a pulse width modulation (PWM) output signal that controls a number of subframes of the frame during which the driving current is provided to the light emitting element of the respective pixel of the plurality of pixels included in the display device.

20. The method of claim 19, wherein the PWM output signal comprises n bits of the n+m-bit control word.

* * * * *